United States Patent
Soldati et al.

(10) Patent No.: US 12,463,883 B2
(45) Date of Patent: Nov. 4, 2025

(54) METHOD FOR MONITORING PERFORMANCE OF AN ARTIFICIAL INTELLIGENCE (AI)/MACHINE LEARNING (ML) MODEL OR ALGORITHM

(71) Applicant: Telefonaktiebolaget LM Ericsson (publ), Stockholm (SE)

(72) Inventors: Pablo Soldati, Solna (SE); Luca Lunardi, Genoa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/290,783

(22) PCT Filed: Aug. 5, 2022

(86) PCT No.: PCT/EP2022/072152
§ 371 (c)(1),
(2) Date: Jan. 21, 2024

(87) PCT Pub. No.: WO2023/012359
PCT Pub. Date: Feb. 9, 2023

(65) Prior Publication Data
US 2024/0243984 A1 Jul. 18, 2024

Related U.S. Application Data

(60) Provisional application No. 63/229,734, filed on Aug. 5, 2021.

(51) Int. Cl.
*G06F 15/173* (2006.01)
*H04L 41/16* (2022.01)
*H04L 43/08* (2022.01)

(52) U.S. Cl.
CPC .............. *H04L 43/08* (2013.01); *H04L 41/16* (2013.01)

(58) Field of Classification Search
CPC ....................................................... H04L 41/16
See application file for complete search history.

(56) References Cited

U.S. PATENT DOCUMENTS

2018/0005139 A1* 1/2018 Dhanyamraju ........ G06N 20/00
2019/0319868 A1 10/2019 Svennebring et al.
(Continued)

OTHER PUBLICATIONS

Author Unknown, "Technical Specification Group RAN; Evolved Universal Terrestrial Radio Access (E-UTRA) and NR; Study on enhancement for Data Collection for NR and EN-DC (Release 17)," Technical Report 37.817, Version 0.1.0, Jan. 2021, 3GPP Organizational Partners, 8 pages.
(Continued)

*Primary Examiner* — Padma Mundur
(74) *Attorney, Agent, or Firm* — Withrow & Terranova, PLLC

(57) ABSTRACT

Monitoring the performance of an Artificial Intelligence (AI)/Machine Learning (ML) model or algorithm is disclosed herein. In one embodiment, a method performed by a first network node in a radio communication network comprises sending at least one first message to a second network node of the radio communication network, the at least one first message comprising a subscription request to obtain from the second network node one or more historical data elements associated with the AI/ML model or algorithm. At least one second message, comprising one or more historical data elements associated with the AI/ML model or algorithm to be monitored by the first network node, is received from the second network node. At least one performance metric associated with the AI/ML model or algorithm to be monitored is determined based on the one or more historical data elements associated with the AI/ML model.

18 Claims, 13 Drawing Sheets

(56) References Cited

U.S. PATENT DOCUMENTS

| | | |
|---|---|---|
| 2021/0021494 A1 | 1/2021 | Yao et al. |
| 2021/0184989 A1 | 6/2021 | Wu et al. |
| 2022/0053591 A1* | 2/2022 | Estevez ................ H04W 24/02 |
| 2024/0129209 A1* | 4/2024 | Karampatsis ......... H04W 24/08 |

OTHER PUBLICATIONS

CMCC, "RP-201620: Revised SID: Study on enhancement for data collection for NR and ENDC," 3GPP TSG RAN Meeting #89e, Sep. 14-18, 2020, Electronic Meeting, 4 pages.
Ericsson, "R3-212978: Framework for RAN intelligence," 3GPP TSG-RAN WG3 Meeting #112-e, May 17-27, 2021, Electronic Meeting, 3 pages.
Ericsson, "R3-206437: AI/ML based Use Cases," 3GPP TSG-RAN WG3 Meeting #110-e, Nov. 2-12, 2020, Electronic Meeting, 16 pages.
Ericsson, "R3-212314: Framework for RAN intelligence," 3GPP TSG-RAN WG3 Meeting #112-e, May 17-27, 2021, Electronic Meeting, 12 pages.
International Search Report and Written Opinion for International Patent Application No. PCT/EP2022/072152, mailed Nov. 28, 2022, 11 pages.

\* cited by examiner

METHOD FOR MONITORING PERFORMANCE OF AN ARTIFICIAL INTELLIGENCE (AI)/MACHINE LEARNING (ML) MODEL OR ALGORITHM

RELATED APPLICATIONS

This application is a 35 U.S.C. § 371 national phase filing of International Application No. PCT/EP2022/072152, filed Aug. 5, 2022, which claims the benefit of provisional patent application Ser. No. 63/229,734, filed Aug. 5, 2021, the disclosures of which are hereby incorporated herein by reference in their entireties.

TECHNICAL FIELD

The present disclosure relates to Artificial Intelligence (AI)/Machine Learning (ML) algorithm development.

BACKGROUND

A Study Item (SI) "Enhancement for Data Collection for NR and EN-DC" is defined in 3GPP RP-201620 aims to study the functional framework for Radio Access Network (RAN) intelligence enabled by further enhancement of data collection through use cases, examples, and the like to identify the potential standardization impacts on current NG-RAN nodes and interfaces.

The detailed objectives of the SI include studying high level principles for RAN intelligence enabled by Artificial Intelligence (AI), developing the functional framework (e.g. the AI functionality and the input/output of the component for AI enabled optimization), and identifying the benefits of AI enabled Next Generation RAN (NG-RAN) through possible use cases such as, e.g. energy saving, load balancing, mobility management, coverage optimization, and the like. Study tasks include the following:
  a) Study standardization impacts for the identified use cases including the data that may be needed by an AI function as input and data that may be produced by an AI function as output, which is interpretable for multi-vendor support.
  b) Study standardization impacts on the node or function in current NG-RAN architecture to receive/provide the input/output data.
  c) Study standardization impacts on the network interface(s) to convey the input/output data among network nodes or AI functions.

As part of the SI work, a Text Proposal (TP) has been agreed for 3GPP Technical Report (TR) 37.817 in R3-212978, as reported below. The TP indicates that the following high level principle should be applied for AI-enable RAN intelligence have been agreed:
  The detailed AI/Machine Learning (ML) algorithms and models for use cases are out of RAN3 scope.
  The study focuses on AI/ML functionality and corresponding types of inputs/outputs.
  The input/output and the location of model inference function should be studied case by case.
  RAN3 should focus on the analysis of data needed at the model training function from external functions, while the aspects of how the model training function uses inputs to train a model are out of RAN3 scope.
  The model training and model inference functions should be able to request, if needed, specific information to be used to train or execute the AI/ML algorithm and to avoid reception of unnecessary information. The nature of such information depends on the use case and on the algorithm.
  The model inference function should signal the outputs of the model only to nodes that have explicitly requested them (e.g., via subscription), or nodes that are subject to actions based on the output from model inference. NG-RAN is prioritized; EN-DC is included in the scope. FFS on whether MR-DC should be down-prioritized.
  A general framework and workflow for AI/ML optimization should be defined and captured in the TR. The generalized workflow should not prevent "thinking beyond" the workflow if the use case requires so.

The Functional Framework for RAN Intelligence comprised in R3-212978 is shown in FIG. 1. The current definitions of the individual blocks and signals represented in the Function Framework of FIG. 1 are detailed below.
  Data Collection is a function that provides input data to model training and model inference functions. AI/ML algorithm specific pre-processing of data is not carried out in the Data Collection function. Examples of input data may include measurements from UEs or different network entities, performance feedback, AI/ML model output.
    Training Data: information needed for the AI/ML model training function.
    Inference Data: information needed as an input for the model inference function to provide a corresponding output.
  Model Training is a function that performs the training of the ML model. The model training function is also responsible for data preparation (e.g., data pre-processing and cleaning, formatting, and transformation of raw data), if required.
  Model Inference is a function that provides AI/ML model inference output (e.g., predictions or decisions). The model inference function is also responsible for data preparation (e.g., data pre-processing and cleaning, formatting, and transformation of raw data), if required.
  Actor is a function that receives the output from the model inference function and triggers or performs corresponding actions. The Actor may trigger actions directed to other entities or to itself.
  Feedback: Information that may be needed to derive training or inference data or performance feedback.

SUMMARY

Systems and methods are disclosed herein for monitoring the performance of an Artificial Intelligence (AI)/Machine Learning (ML) model or algorithm. Embodiments of a method performed by a first network node in a radio communication network to monitor the performance of an AI/ML model or algorithm are disclosed herein. The method comprises sending at least one first message to a second network node of the radio communication network, the at least one first message comprising a subscription request to obtain from the second network node one or more historical data elements associated with the AI/ML model or algorithm. The method further comprises receiving at least one second message from the second network node, the at least one second message comprising one or more historical data elements associated with the AI/ML model or algorithm to be monitored by the first network node. The method also comprises determining at least one performance metric associated with the AI/ML model or algorithm to be monitored based on the one or more historical data elements associated with the AI/ML model.

In some embodiments, the subscription request comprises one or more of an identifier of the first network node, an identifier for the subscription request, an indication of a request type, an indication of a reason or cause for the request, one or more indications of a corresponding one or more AI/ML models or algorithms to be monitored, an indication of a network node hosting a model inference function associated with the AI/ML model or algorithm to be monitored, one or more indications of a time or period of the collection of data, an indication of the type of data requested, a timing-related indications, one or more filtering criteria indicating a type or scope of requested historical data, one or more requests to receive from the second network node notifications associated with the historical data, and one or more conditions pertaining to the sending of historical data. According to some such embodiments, the indication of the request type comprises an indication to initiate a subscription, an indication to renew a subscription, or an indication to cancel a subscription. Some such embodiments may provide that the indication of the type of data requested comprises one or more of historical inference input data associated with the AI/ML model to be monitored; historical inference output associated with the AI/ML model to be monitored, comprising one or more information elements that resulted from each inference step executed by the AI/ML model or algorithm to be monitored; and historical measurements of information that the AI/ML model or algorithm to be monitored is configured to estimate or predict.

In some such embodiments, the one or more filtering criteria indicating the type or scope of requested historical data comprises one or more of periods of collection, data selected in a random fashion, data associated with one or more radio network procedure, data related to one or more user equipment (UE) or type of UE, data pertaining to performance indicators, data pertaining to UE or network configuration data, data collected for one or more area of interests, data collected for one or more S-NSSAI, data collected for or one or more 5QI, data collected for one or more services, data collected for MDT, data collected for QoE, radio measurements, load metrics, and data related to energy savings. According to some such embodiments, the one or more conditions pertaining to the sending of historical data comprises one or more of a periodic sending with a reporting periodicity, a sending based on event, timing indications, indications of a size of historical data required to monitor the AI/ML model or algorithm, and indications to start, stop, pause, or resume sending of historical data. Some such embodiments may provide that the one or more requests to receive from the second network node notifications associated with the historical data comprises a request to receive a notification when requested data is available or not available, when historical data of a certain type becomes available, when a modification is occurring or has occurred in the historical data, which type of modification or a quantification of the change, or when sending historical data is expected to start, stop, pause, or resume.

In some embodiments, the at least one second message comprises one or more of an identifier of the second network node, an identifier of the subscription request, an identifier of the request type, historical data stored or collected by the second network node associated with the AI/ML model or algorithm to be monitored, and a timing related indications. According to some embodiments, the at least one second message further comprises an indication of one or more fourth network nodes that can be requested to send historical data, and the indication comprises one or more of an Internet Protocol, IP, address, a Uniform Resource Locator (URL), and a Uniform Resource Indicator (URI). Some embodiments may provide that the at least one second message further comprises at least one notification providing the first network node with a response to one or more notification requests of the first message.

In some embodiments, the performance metric comprises one or more of an indication of accuracy of a model inference function, an indication of whether or not an output of an AI/ML model inference is affected by a certain type of uncertainty, an indication of a type of uncertainty affecting the output of the AI/ML model inference, an indication of a level of uncertainty affecting the output of the AI/ML model inference, and an indication of a bias in an input or in the output of the AI/ML model inference. According to some embodiments, the first network node hosts a model training function of the AI/ML model or algorithm to be monitored, the second network node hosts a data collection function of an AI/ML model or algorithm, a third network node hosts a model inference function of the AI/ML model or algorithm. Some such embodiments may provide that the method further comprises sending a third message to the second network node, the third message comprising a request to subscribe to one or more training data samples associated with the AI/ML model monitored by the first network node. In some such embodiments, the method further comprises receiving a fourth message from the second network node, the fourth message comprising one or more training data samples associated with the AI/ML model or algorithm to be monitored. According to some such embodiments, the fourth message comprises an indication of one or more fourth network nodes that can be contacted to obtain training data samples associated with the AI/ML model or algorithm, and the indication comprises one or more of an Internet Protocol, IP, address, a Uniform Resource Locator (URL), and a Uniform Resource Indicator (URI). Some such embodiments may provide that the method further comprises training the AI/ML model. In some such embodiments, the method further comprises sending a fifth message to a third network node to update the AI/ML model.

In some embodiments, the first network node hosts a model inference function of the AI/ML model or algorithm to be monitored, the second network node hosts a data collection function of the AI/ML model or algorithm, and a third network node hosts a model training function of the AI/ML model or algorithm. According to some such embodiments, the method further comprises sending a fifth message to the third network node, the fifth message comprising a performance metric associated with the AI/ML model monitored by the first network node. Some such embodiments may provide that the method further comprises determining an indication of whether the AI/ML model fulfills a retraining criterion, based on at least one performance metric associated with the AI/ML model or algorithm to be monitored. The method also comprises sending a fifth message to the third network node, the fifth message comprising a request to retrain the AI/ML model or algorithm.

In some such embodiments, the retraining criterion comprises one or more of a criterion indicating that the AI/ML model should be retrained if at least one model performance metric is less than or exceeds a first threshold, a criterion indicating that the AI/ML model should be retrained if at least one model performance metric is less than a first threshold and exceeds a second threshold, a criterion indicating that the AI/ML model should be retrained if at least one model performance metric is less than a first threshold for at least a pre-defined period of time, a criterion indicating that the AI/ML model should be retrained if at least one model performance metric is less than or exceeds a first threshold, a criterion indicating that the AI/ML model should be retrained if at least one model performance metric is less than a first threshold and exceeds a second threshold, a criterion indicating that the AI/ML model should be retrained if the average of at least one model performance metric over a pre-defined period of time is less than a first threshold, and a criterion indicating that the AI/ML model should be retrained a second statistical momentum of at least one model performance metric over a pre-defined period of time is less than a first threshold. According to some embodiments, the method further comprises receiving a sixth message from the third network node, the sixth message comprising an updated AI/ML model.

Embodiments of a first network node for monitoring the performance of an AI/ML model or algorithm are also disclosed herein. Some embodiments may provide that the first network node comprises one or more transmitters, one or more receivers, and processing circuitry associated with the one or more transmitters and the one or more receivers. The processing circuitry is configured to cause the first network node to send at least one first message to a second network node of the radio communication network, the at least one first message comprising a subscription request to obtain from the second network node one or more historical data elements associated with the AI/ML model or algorithm. The processing circuitry is further configured to cause the first network node to receive at least one second message from the second network node, the at least one second message comprising one or more historical data elements associated with the AI/ML model or algorithm to be monitored by the first network node. The processing circuitry is also configured to cause the first network node to determine at least one performance metric associated with the AI/ML model or algorithm to be monitored based on the one or more historical data elements associated with the AI/ML model. In some embodiments, the processing circuitry is further configured to cause the first network node to perform any of the operations attributed to the first network node above.

Embodiments of a network node for monitoring the performance of an AI/ML model or algorithm are also disclosed herein. According to some embodiments, the network node is adapted to send at least one first message to a second network node of the radio communication network, the at least one first message comprising a subscription request to obtain from the second network node one or more historical data elements associated with the AI/ML model or algorithm. The network node is further adapted to receive at least one second message from the second network node, the at least one second message comprising one or more historical data elements associated with the AI/ML model or algorithm to be monitored by the first network node. The network node is also adapted to determine at least one performance metric associated with the AI/ML model or algorithm to be monitored based on the one or more historical data elements associated with the AI/ML model. Some embodiments may provide that the first network node is further adapted to perform any of the operations attributed to the first network node above.

Embodiments of a method performed by a second network node in a radio communication network for hosting a data collection function of an AI/ML model or algorithm are also disclosed herein. The method comprises receiving at least one first message from a first network node of the radio communication network, the at least one first message comprising a subscription request to obtain from the second network node one or more historical data elements associated with the AI/ML model or algorithm. The method further comprises sending at least one second message to the first network node, the at least one second message comprising one or more historical data elements associated with the AI/ML model or algorithm to be monitored by the first network node. In some embodiments, the method further comprises receiving a third message from the first network node, the third message comprising a request to subscribe to one or more training data samples associated with the AI/ML model monitored by the first network node. The method also comprises sending a fourth message to the first network node, the fourth message comprising one or more training data samples associated with the AI/ML model or algorithm to be monitored. According to some embodiments, the second message further comprises an indications of one or more fourth network nodes that can be requested to send historical data. Some embodiments may provide that the second message further comprises at least one notification providing the first network node with a response to one or more notification requests of the first message.

Embodiments for a second network node for hosting a data collection function of an AI/ML model or algorithm are also disclosed herein. In some embodiments, the second network node comprises one or more transmitters, one or more receivers, and processing circuitry associated with the one or more transmitters and the one or more receivers. The processing circuitry is configured to cause the second network node to receive at least one first message from a first network node of the radio communication network, the at least one first message comprising a subscription request to obtain from the second network node one or more historical data elements associated with the AI/ML model or algorithm. The processing circuitry is further configured to cause the second network node to send at least one second message to the first network node, the at least one second message comprising one or more historical data elements associated with the AI/ML model or algorithm to be monitored by the first network node. According to some embodiments, the processing circuitry further is configured to cause the second network node to perform any of the operations attributed to the second network node above.

Embodiments of a second network node for hosting a data collection function of an AI/ML model or algorithm are also disclosed herein. Some embodiments may provide that the second network node is adapted to receive at least one first message from a first network node of the radio communication network, the at least one first message comprising a subscription request to obtain from the second network node one or more historical data elements associated with the AI/ML model or algorithm. The second network node is further adapted to send at least one second message to the first network node, the at least one second message comprising one or more historical data elements associated with the AI/ML model or algorithm to be monitored by the first network node. In some embodiments, the second network node is further adapted to perform any of the operations attributed to the second network node above.

Embodiments of a third network node in a radio communication network for hosting a model training function of an AI/ML model or algorithm are also disclosed herein. According to some embodiments, the method comprises receiving a fifth message from a first network node, the fifth message comprising one or more of at least one performance metric associated with an AI/ML model or algorithm monitored by the first network node and a request to retrain the AI/ML model or algorithm monitored by the first network node. The method further comprises sending a third message to a second network node comprising a request to subscribe to one or more training data samples associated with the AI/ML model or algorithm monitored by the first network node. The method also comprises receiving at least one fourth message from the second network node, the at least one fourth message comprising one or more training data samples associated with the AI/ML model or algorithm monitored by the first network node. The method additionally comprises sending a sixth message to the first network node, the sixth message comprising an updated AI/ML model.

Embodiments of a third network node for hosting a model training function of an AI/ML model or algorithm are also disclosed herein. Some embodiments may provide that the third network node comprises one or more transmitters, one or more receivers, and processing circuitry associated with the one or more transmitters and the one or more receivers. The processing circuitry is configured to cause the third network node to receive a fifth message from a first network node, the fifth message comprising one or more of at least one performance metric associated with an AI/ML model or algorithm monitored by the first network node and a request to retrain the AI/ML model or algorithm monitored by the first network node. The processing circuitry is further configured to cause the third network node to send a third message to a second network node comprising a request to subscribe to one or more training data samples associated with the AI/ML model or algorithm monitored by the first network node. The processing circuitry is also configured to cause the third network node to receive at least one fourth message from the second network node, the at least one fourth message comprising one or more training data samples associated with the AI/ML model or algorithm monitored by the first network node. The processing circuitry is additionally configured to cause the third network node to send a sixth message to the first network node, the sixth message comprising an updated AI/ML model.

Embodiments of a third network node for hosting a model training function of an AI/ML model or algorithm are also disclosed herein. In some embodiments, the third network node is adapted to receive a fifth message from a first network node, the fifth message comprising one or more of at least one performance metric associated with an AI/ML model or algorithm monitored by the first network node and a request to retrain the AI/ML model or algorithm monitored by the first network node. The third network node is further adapted to send a third message to a second network node comprising a request to subscribe to one or more training data samples associated with the AI/ML model or algorithm monitored by the first network node. Then third network node is also adapted to receive at least one fourth message from the second network node, the at least one fourth message comprising one or more training data samples associated with the AI/ML model or algorithm monitored by the first network node. The third network node is additionally adapted to send a sixth message to the first network node, the sixth message comprising an updated AI/ML model.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

There currently exist certain challenge(s). In particular, in the current Function Framework for RAN Intelligence, there is no clear indication as to how model training and model inference function can request information to be used to train or execute the AI/ML algorithm. During the operation of an AI/ML model, it may happen that the accuracy of the output predictions drops or that individual point predictions, even though accurate in average, may suffer different levels of uncertainty. For instance, an AI/ML model or algorithm may in average perform well, e.g., by providing a good level of accuracy over multiple model inference output samples, but individual model inference output may experience a relatively high uncertainty (regardless whether the prediction was correct or not).

Therefore, in a scenario where model chaining is applied (namely, where either when the output of a first the AI/ML model is provided as input to a second network function (e.g. to a second AI/ML model or to a second model), or in general where the output of one model is given as input to a further process that uses such output to determine specific actions), the second node hosting the second model may receive inputs with high uncertainty which could compromise its performance.

Aspects of the present disclosure and their embodiments may provide solutions to the aforementioned or other challenges. Disclosed herein is a solution wherein a first network node sends to a second network node a subscription request to obtain historical data required to either train or execute an AI/ML model or algorithm, and receives such historical data from the second network node or from another network node (a fourth network node) indicated by the second network node to the first network node.

Figure 1:
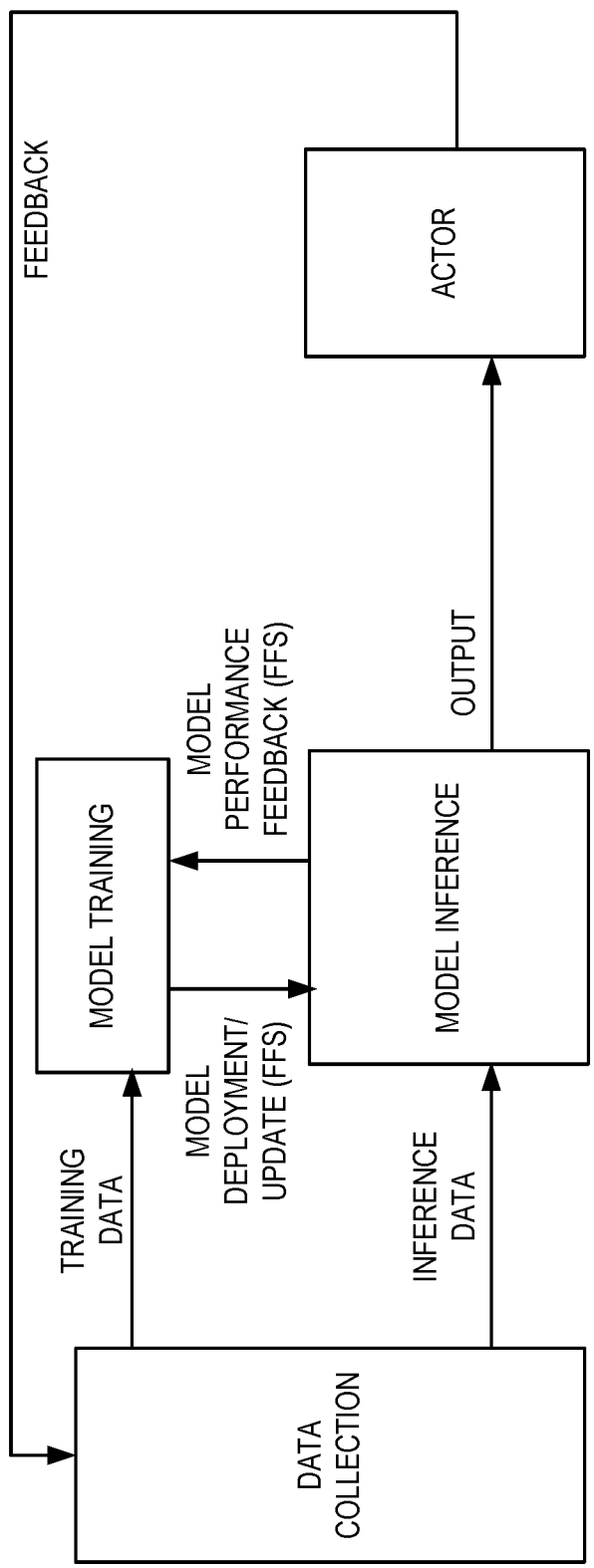
FIG. 1 illustrates a Functional Framework for Radio Access Network (RAN) Intelligence as described in R3-212978.
Figure 2:
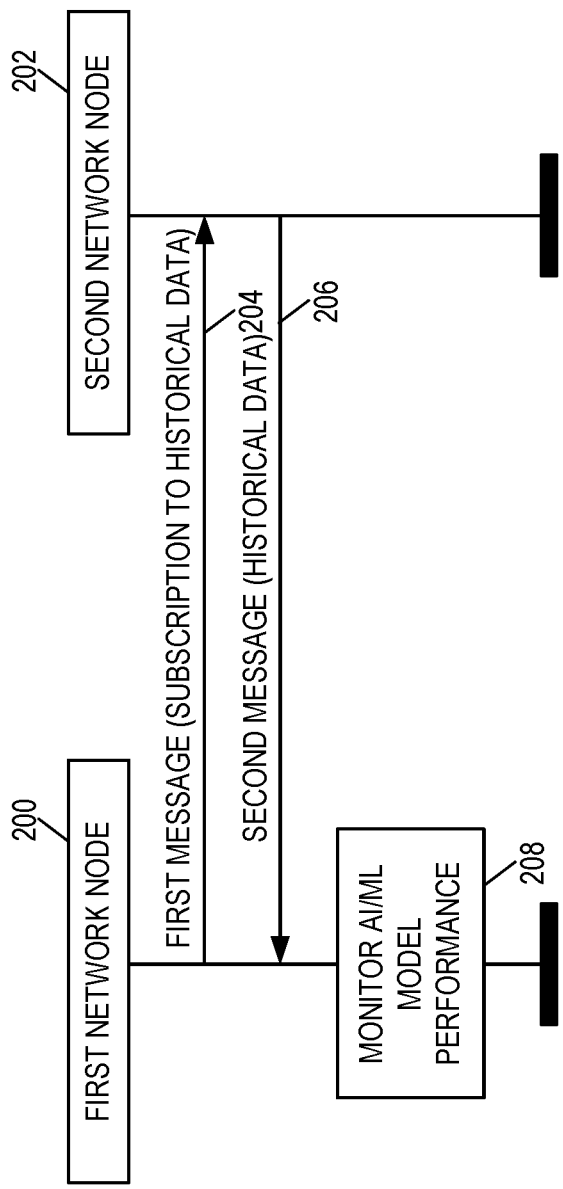
FIG. 2 illustrates exemplary operations executed by a first network node to monitor the performance of an AI/ML model or algorithm in a radio communication network, according to some embodiments disclosed herein.

FIG. 2 illustrates exemplary operations executed by a first network node 200 to monitor the performance of an AI/ML model or algorithm in a radio communication network according to some embodiments. The exemplary operations include:
  at least a first message to a second network node 202 comprising a request to subscribe for historical data associated with the AI/ML model or algorithm to be monitored, as indicated by arrow 204;
  Receiving at least a second message from the second network node comprising one or more historical data associated with the AI/ML model or algorithm to be monitored by the first network node, as indicated by arrow 206
  Determining or obtaining at least a performance metric associated with the AI/ML model based at least in part on the received historical data associated with the AI/ML model or algorithm (i.e., as part of monitoring the AI/ML model performance, as indicated by block 208).

Some embodiments are directed to the case where first network node hosts an AI/ML model training function. In some such embodiments, illustrated in FIG. 3, the first network node is the host of a model training function responsible to train/update the AI/ML model or algorithm to be monitored, and the third network node is the host of a model inference function for the AI/ML model monitored by the first network node. In this case, exemplary operations may further comprise:
  If at least one model performance metric of the AI/ML model falls below a threshold, retrain the AI/ML model
  In addition, retraining the AI/ML model may further comprise operations to:
  Send a third message to the second network node comprising a request to subscribe to one or more training data samples associated with the AI/ML model monitored by the first network node, as indicated by arrow 300.
  Receive at least a fourth message from the second network node comprising one or more training data samples associated with the AI/ML model monitored by the first network node, as indicated by arrow 302.
  Train/update the AI/ML model
  Furthermore, exemplary operations according to some embodiments may include operations to:
  Send a fifth message to a third network node the fifth message comprising the update AI/ML model, as indicated by arrow 304.

Figure 4:
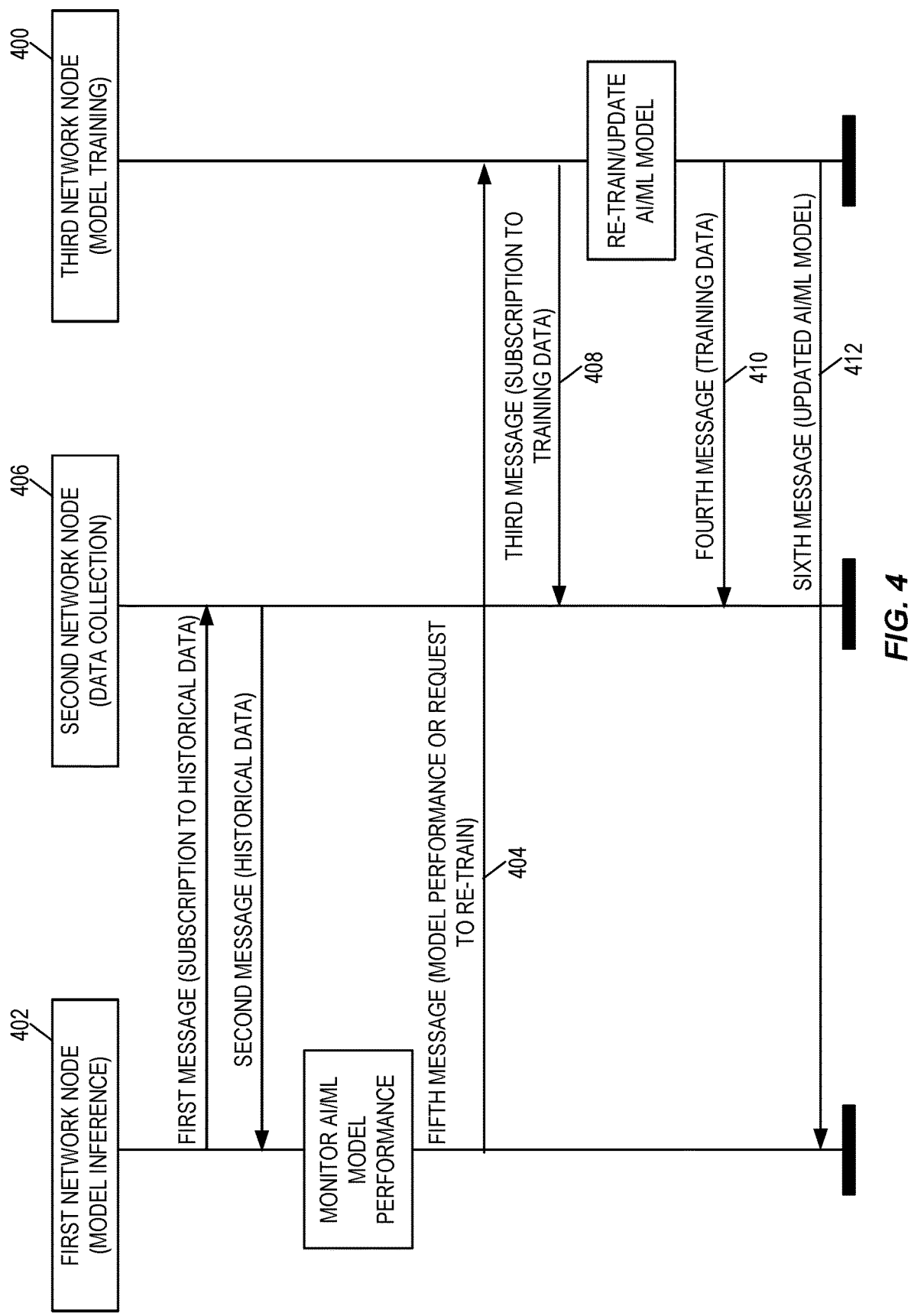
FIG. 4 illustrates an exemplary embodiment in which a third network node is a host of a model training function responsible for training an AI/ML model or algorithm to be monitored, and a first network node is a host of a model inference function responsible for executing the AI/ML model or algorithm to be monitored.

In some embodiments illustrated in FIG. 4, a third network node 400 is the host of a model training function responsible for training the AI/ML model or algorithm to be monitored, and a first network node 402 is the host of a model inference function responsible for executing the AI/ML model or algorithm to be monitored. In this case, exemplary operations according to some embodiments may include operations to:
  Send a fifth message to the third network node 400, the fifth message comprising at least one performance metric associated with the AI/ML model monitored the by the first network node, as indicated by arrow 404. In some embodiments, exemplary operations according to some embodiments may include operations to:
  Determine or obtain an indication, based at least in part on at least one performance metric associated with the AI/ML model or algorithm to be monitored, whether the AI/ML models fulfil at least a re-training criteria
  Send the fifth message to the third network node comprising a request to re-train the monitored AI/ML model) In some embodiments wherein the first network node is the host of a model inference function responsible for executing the AI/ML model or algorithm to be monitored, exemplary operations according to some embodiments may include operations to:
  Receiving a sixth message from the third network node, the sixth message comprising an updated AI/ML model (based on the previous request or on the indicated model performance feedback)

Some embodiments further provide for operations performed by a second network node. Exemplary operations according to such embodiments may include operations for:
  Receiving a first message from a first network node comprising a request to subscribe for historical data used by the AI/ML model or algorithm to be monitored by the first network node.
  Sending at least a second message to the first network node comprising one or more historical data associated with the AI/ML model or algorithm to be monitored by the first network node The operations performed by the second network node may additionally comprise operations to:
  Receive a third message from the first network node or from the third network node comprising a request to subscribe to one or more training data samples associated with the AI/ML model monitored by the first network node.

Send at least a fourth message to the first network node or to the third network node comprising one or more training data samples associated with the AI/ML model monitored by the first network node.

Some embodiments also include operations executed by a third network node. In such embodiments, operations include:

Receiving a fifth message from a first network node comprising the update AI/ML model; OR Receiving a fifth message from the first network node comprising at least one performance metric associated with the AI/ML model monitored the by the first network node and/or a request to re-train the AI/ML monitored by the first network node.

Figure 3:
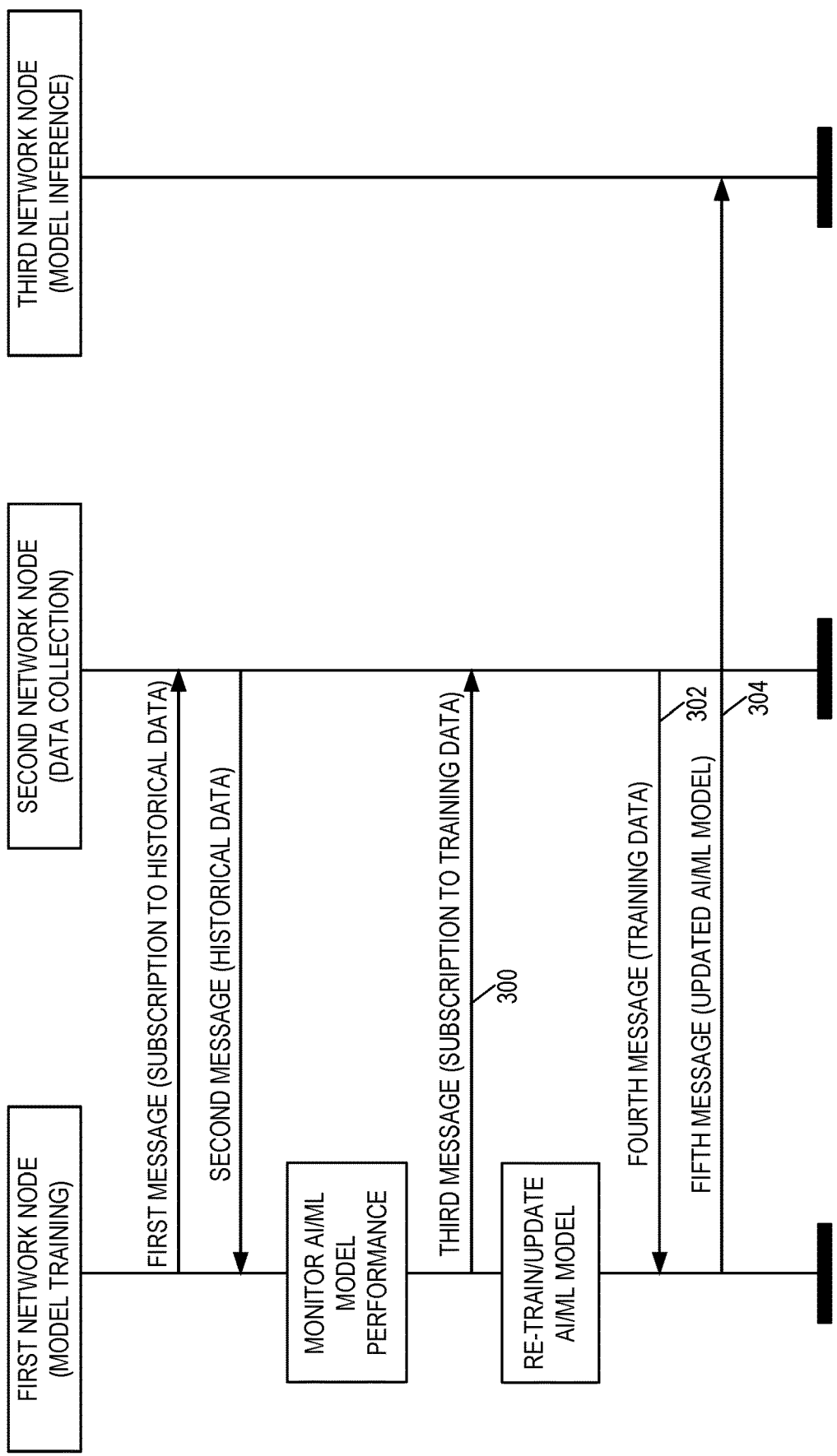
FIG. 3 illustrates an exemplary embodiment in which a first network node is a host of a model training function responsible for training and/or updating an AI/ML model or algorithm to be monitored, and a third network node is a host of a model inference function for the AI/ML model monitored by the first network node.

In some embodiments illustrated in FIG. 3, wherein the third network node receives fifth message from a first network node comprising the update AI/ML model monitored by the first network node, the third network node is the host of a model inference function.

In some embodiments illustrated in FIG. 4 wherein the third network node receives the fifth message from the first network comprising at least one of the performance metric associated with the AI/ML model monitored the by the first network node and/or a request to re-train the AI/ML monitored by the first network node, the third network node is the host of a model training function. In this case, third network node may further determine to retrain the AI/ML model monitored by the first network node based on the information comprised in the fifth message, and may further:

Send a third message to the second network node (e.g., a second network node 406 of FIG. 4) comprising a request to subscribe to one or more training data samples associated with the AI/ML model monitored by the first network node (e.g., as indicated by arrow 408 of FIG. 4).

Receive at least a fourth message from the second network node comprising one or more training data samples associated with the AI/ML model monitored by the first network node (e.g., as indicated by arrow 410 of FIG. 4)

Additionally, in this case, the third network node may further

Send a sixth message to the first network node, the sixth message comprising an updated AI/ML model (based on the previous request or on the indicated model performance feedback) (e.g., as indicated by arrow 412 of FIG. 4).

Embodiments disclosed herein include the use of a subscription request to obtain historical data and a subsequent reception of such data, wherein the historical data can be used either by an AI/ML model training function to train the AI/ML model or by an AI/ML model inference function to execute the AI/ML model. The solution is applicable to two scenarios depending on the functions hosted by the network nodes, and the first two steps of the solution are common for the two scenarios: step 1 for subscription request and step 2 for reception of historical data. In a first scenario, the first network node hosts a training function of an AI/ML model and the second network node host a data collection function of an AI/ML model and the main operations are:

(step 1) the first network node sends one or more first message to a second network node to subscribe for reception of historical data; and (step 2) the first network node receives one or more second message from the second network node comprising historical data Additionally, the first network node can perform one or more of the following:

monitor the AI/ML model performance;

re-train the AI/ML model;

send a FIFTH message to a third network node hosting the model inference function of the AI/ML model to update the AI/ML model In a second scenario, the first network node hosts an inference function of an AI/ML model and the second network node hosts a data collection function of an AI/ML model and the main steps are:

(step 1) the first network node sends one or more first message to a second network node to subscribe for reception of historical data (step 2) the first network node receives one or more second message from the second network node comprising historical data Additionally, the first network node can perform one or more of the following:

monitor the AI/ML model performance;

send a fifth message to a third network node hosting the model training function of the AI/ML model provide feedback on model performance and/or request to train the model;

receive a sixth message from the third network node to update the AI/ML model.

Certain embodiments may provide one or more of the following technical advantage(s). The proposed solution enables the possibility of optimizing the performance of an AI/ML model or algorithm deployed in a communication network. The proposed solution may also ensures that an AI/ML model or algorithm maintains a desired level of performance. In one example, when the output of the AI/ML model is provided as input to a second network function (e.g. to a second AI/ML model or to a further process that uses such output to determine specific actions), the second node hosting the second function could be informed of the uncertainty of the information provided by the AI/ML model or algorithm, thereby avoiding operating with information characterized by high uncertainty which could otherwise compromise its performance.

Before discussing monitoring the performance of an AI/ML model or algorithm in greater detail, the following terms are first defined:

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Transmission/Reception Point (TRP): In some embodiments, a TRP may be either a network node, a radio head, a spatial relation, or a Transmission Configuration Indicator (TCI) state. A TRP may be represented by a spatial relation or a TCI state in some embodiments. In some embodiments, a TRP may be using multiple TCI states. In some embodiments, a TRP may a part of the gNB transmitting and receiving radio signals to/from UE according to physical layer properties and parameters inherent to that element. In some embodiments, in Multiple TRP (multi-TRP) operation, a serving cell can schedule UE from two TRPs, providing better Physical Downlink Shared Channel (PDSCH) coverage, reliability and/or data rates. There are two different operation modes for multi-TRP: single Downlink Control Information (DCI) and multi-DCI. For both modes, control of uplink and downlink operation is done by both physical layer and Medium Access Control (MAC). In single-DCI mode, UE is scheduled by the same DCI for both TRPs and in multi-DCI mode, UE is scheduled by independent DCIs from each TRP.

In some embodiments, a set Transmission Points (TPs) is a set of geographically co-located transmit antennas (e.g., an antenna array (with one or more antenna elements)) for one cell, part of one cell or one Positioning Reference Signal (PRS)-only TP. TPs can include base station (eNB) antennas, Remote Radio Heads (RRHs), a remote antenna of a base station, an antenna of a PRS-only TP, and the like. One cell can be formed by one or multiple TPs. For a homogeneous deployment, each TP may correspond to one cell.

In some embodiments, a set of TRPs is a set of geographically co-located antennas (e.g., an antenna array (with one or more antenna elements)) supporting TP and/or Reception Point (RP) functionality.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Figure 5:
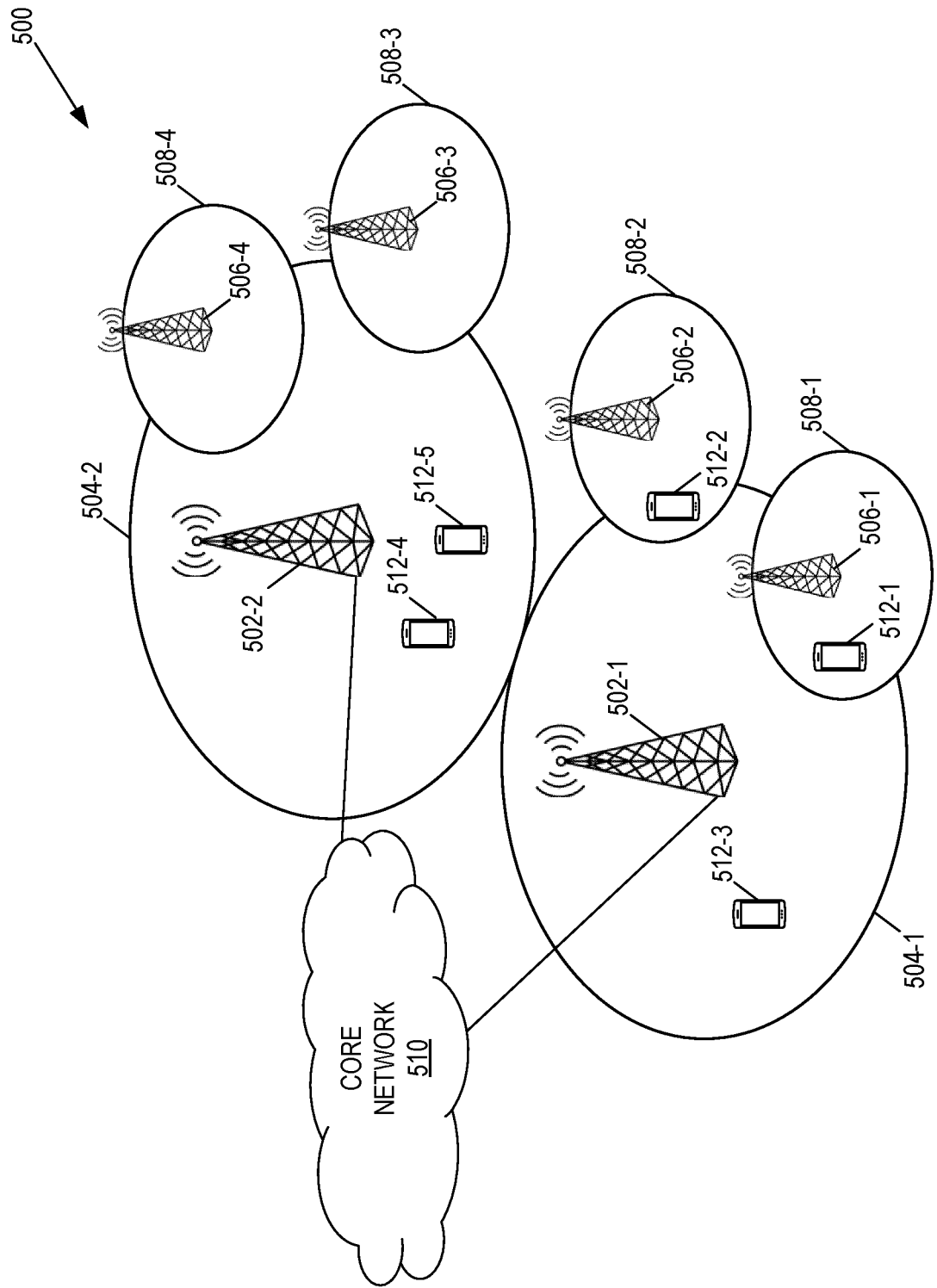
FIG. 5 illustrates one example of a cellular communications system according to some embodiments disclosed herein.

FIG. 5 illustrates one example of a cellular communications system 500 in which embodiments of the present disclosure may be implemented. In the embodiments described herein, the cellular communications system 500 is a 5G system (5GS) including a Next Generation RAN (NG-RAN) and a 5G Core (5GC) or an Evolved Packet System (EPS) including an Evolved Universal Terrestrial RAN (E-UTRAN) and an Evolved Packet Core (EPC). In this example, the RAN includes base stations 502-1 and 502-2, which in the 5GS include NR base stations (gNBs) and optionally next generation eNBs (ng-eNBs) (e.g., LTE RAN nodes connected to the 5GC) and in the EPS include eNBs, controlling corresponding (macro) cells 504-1 and 504-2. The base stations 502-1 and 502-2 are generally referred to herein collectively as base stations 502 and individually as base station 502. Likewise, the (macro) cells 504-1 and 504-2 are generally referred to herein collectively as (macro) cells 504 and individually as (macro) cell 504. The RAN may also include a number of low power nodes 506-1 through 506-4 controlling corresponding small cells 508-1 through 508-4. The low power nodes 506-1 through 506-4 can be small base stations (such as pico or femto base stations) or RRHs, or the like. Notably, while not illustrated, one or more of the small cells 508-1 through 508-4 may alternatively be provided by the base stations 502. The low power nodes 506-1 through 506-4 are generally referred to herein collectively as low power nodes 506 and individually as low power node 506. Likewise, the small cells 508-1 through 508-4 are generally referred to herein collectively as small cells 508 and individually as small cell 508. The cellular communications system 500 also includes a core network 510, which in the 5G System (5GS) is referred to as the 5GC. The base stations 502 (and optionally the low power nodes 506) are connected to the core network 510.

The base stations 502 and the low power nodes 506 provide service to wireless communication devices 512-1 through 512-5 in the corresponding cells 504 and 508. The wireless communication devices 512-1 through 512-5 are generally referred to herein collectively as wireless communication devices 512 and individually as wireless communication device 512. In the following description, the wireless communication devices 512 are oftentimes UEs, but the present disclosure is not limited thereto.

For the proposed solution, a network node can be a RAN node, an OAM, a Core Network node, an OAM, an SMO, a Network Management System (NMS), a Non-Real Time RAN Intelligent Controller (Non-RT RIC), a Real-Time RAN Intelligent Controller (RT-RIC), a gNB, eNB, en-gNB, ng-eNB, gNB-CU, gNB-CU-CP, gNB-CU-UP, eNB-CU, eNB-CU-CP, eNB-CU-UP, IAB-node, IAB-donor DU, IAB-donor-CU, IAB-DU, IAB-MT, O-CU, O-CU-CP, O-CU-UP, O-DU, O-RU, O-eNB, or a UE. The methods provided with the present invention are independent with respect to specific AI/ML model types or learning problems/setting (e.g., supervised learning, unsupervised learning, reinforcement learning, hybrid learning, centralized learning, federated learning, distributed learning, and the like). Non-limiting examples of AI/ML algorithms may include supervised learning algorithms, deep learning algorithms, reinforcement learning type of algorithms (such as DQN, A2C, A3C, and the like), contextual multi-armed bandit algorithms, autoregression algorithms, and the like., or combinations thereof. Such algorithms may exploit functional approximation models, hereafter referred to as AI/ML models, such as neural networks (e.g., feedforward neural networks, deep neural networks, recurrent neural networks, convolutional neural networks, and the like).

Examples of reinforcement learning algorithms may include deep reinforcement learning (such as deep Q-network (DQN), proximal policy optimization (PPO), double Q-learning), actor-critic algorithms (such as Advantage actor-critic algorithms, e.g. A2C or A3C, actor-critic with experience replay, etc.), policy gradient algorithms, off-policy learning algorithms, and the like.

In some embodiments a first network node in a radio communication network is configured to monitor the performance of an AI/ML model or algorithm
- sends at least one first message to a second network node of the radio communication network, the first MESSAGE comprising a subscription request to obtain from the second network node one or more historical data associated with the AI/ML model or algorithm to be monitored, wherein a subscription request can comprise one or more of the following:
  - an identifier of the first network node
  - an identifier for the subscription request
  - an indication, identifying a request type (e.g., to initiate a subscription, or to renew a subscription, or to cancel a subscription)
  - an indication, indicating the reason or the cause for the request. In one example, a reason or cause value e.g., "model performance monitoring" could be used for the subscription request.
  - indication(s) of at least one AI/ML model or algorithm to be monitored
  - an indication of the node hosting the model inference function associated with the AI/ML model or algorithm to be monitored.
  - Indication(s) of the time or period of the collection of data, such as data collected for a certain time prior to the present time.
  - An indication of the type of data requested, which may include or more of historical data samples comprising
    - Historical inference input data associated with the AI/ML model to be monitored, such as measurements or estimate of the network state and/or user state that were used for inference of the AI/ML model or algorithm.
    - Historical inference output associated with the AI/ML model to be monitored, that is one or more information element resulted from each inference step executed by the AI/ML model or algorithm to be monitored.
    - Historical measurements of information that the AI/ML model or algorithm to be monitored is configured to estimate or predict.
  - timing related indications, indicating e.g., a validity time associated with the subscription
  - one or more filtering criteria concerning types and scopes of requested historical data.
    - Non-limiting examples can be: one or more period of collection, data selected in a random fashion, data associated with one or more radio network procedure (e.g. mobility), data related to one or more user equipment or type of user equipment, data pertaining to performance indicators, to UE or network configuration data, data collected for one or more area of interests (e.g. one or more coverage area, one or more cell, one or more carrier frequency, one or more TAs, one or more TAIs, one or more PLMN, one or more RAT), data collected for one or more S-NSSAI, or one or more 5QI, or one or more service, data collected for MDT, data collected for QoE, radio measurements, load metrics, data related to energy savings (e.g. an energy score)
    - filtering criteria can be combined. For example, the request of historical data can indicate that data of interest is a load metric for a list of cells, or an energy score and corresponding UE configuration data.
  - one or more conditions pertaining to the sending of historical data, such as:
    - a periodic sending with a reporting periodicity
    - a sending based on event (e.g., upon availability of the data)
    - timing indications such as a start time for initiating the sending, an end time to stop the sending, a duration during which the sending can happen
    - indications of a size of historical data required to monitor the AI/ML model or algorithm, such as the number of data samples per batch of historical data to be provided to the first network node, a minimum, a maximum amount of historical data (overall and/or per attempt of sending)
    - indications to pause or resume sending of historical data
  - one or more requests to receive from the second network node notifications associated with the historical data
    - Non-limiting examples can be to request to receive a notification:
      - when requested data is available or not available
      - when historical data of a certain type becomes available
      - when a modification is occurring or has occurred in the historical data, and optionally which type of modification and/or a quantification of the change (e.g., historical data may change when a new service is activated, or a new option becomes available (e.g., a new S-NSSAI or a new PLMN is introduced) or when a new performance indicator is introduced)

when sending historical data is expected to start/stop/pause/resume.

and receives at least one second message from the second network node comprising one or more historical data associated with the AI/ML model or algorithm to be monitored by the first network node:
an identifier of the second network node
an identifier of the subscription request
an identifier of the request type
historical data stored or collected by the second network node associated with the AI/ML model or algorithm to be monitored
timing related indications, indicating e.g., a time of validity/expiration for the subscription.

A second message can be used to confirm or to refuse the subscription request included in the first message.

A second message can be sent synchronously or asynchronously to the first message.

In one variant a second message may comprise indications indicating one or more fourth network nodes that can be requested to send historical data, wherein a fourth network node can be comprised within a radio communication network or outside a radio communication network. As non-limiting examples, the said indications can be one or more IP address, one or more Uniform Resource Locator (URL), one or more Uniform Resource Indicator (URI).

In another variant a second message may also comprise at least one notification notifying the first network node to:
provide the first network node with a response concerning the one or more notification requests comprised in the first message and the first network node determines or obtains at least a performance metric associated with the AI/ML model or algorithm to be monitored, based at least in part on the received historical data associated with the AI/ML model.

A performance metric associated with the AI/ML model or algorithm can be at least one of:
indications of the accuracy of the model inference function, such as a prediction accuracy, based on the on the received historical data associated with the AI/ML model.
indications indicating whether or not the output of an AI/ML model inference is affected by a certain type of uncertainty (e.g., if the output is affected by epistemic uncertainty)
type(s) of uncertainties affecting the output of model inference
level(s) of uncertainties affecting the output of the model inference
indications of a bias in the input or in the output of an AI/ML model inference In some embodiments of the method, the first network node either hosts a model training function or hosts a model inference function of the AI/ML model or algorithm to be monitored, and the second network node hosts a data collection function of an AI/ML model or algorithm.

Figure 6:
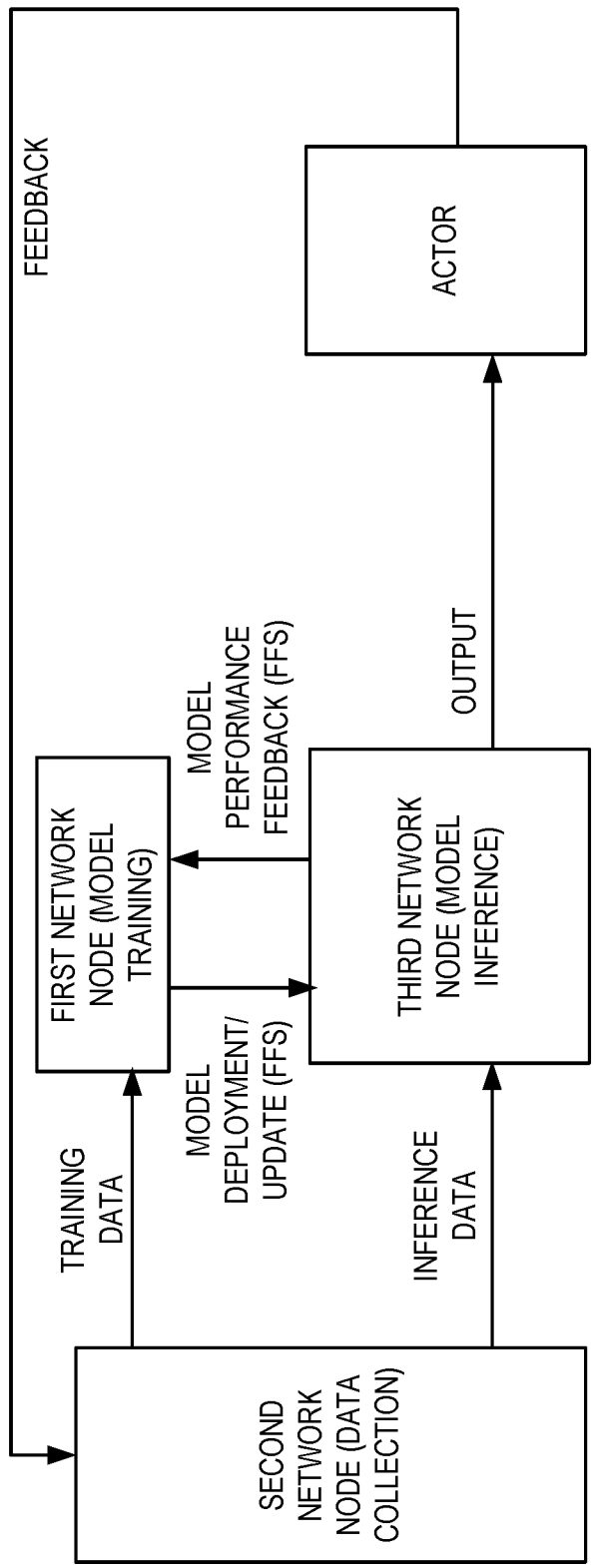
FIG. 6 illustrates an exemplary embodiment in which a first network node hosts a training function, a second network node hosts a data collection function, and a third network node hosts a model inference function, according to some embodiments disclosed herein.

In a first scenario, a first network node hosts a training function, a second network node hosts a data collection function, and a third network node hosts a model inference function. FIG. 6 illustrates this scenario using the AI/ML functional framework discussed in 3GPP. In FIG. 6, operations may further include the embodiments listed below. In some embodiments, the first network node sends a third message to the second network node, comprising:
a request to subscribe to one or more training data samples associated with the AI/ML model monitored by the first network node A third message can comprise the same type of indications/conditions/requests as described for a first message and referred to training data samples instead of historical data In some embodiments, the first network node receives a fourth message from the second network node, comprising one or more training data samples associated with the AI/ML model or algorithm to be monitored by the first network node. In one variant the fourth message may comprise indications indicating one or more fourth network nodes that can be contacted to obtain training data samples associated with the AI/ML model, wherein a fourth network node can be comprised within a radio communication network or outside a radio communication network. As non-limiting examples, the said indications can be one or more IP address, one or more Uniform Resource Locator (URL), one or more Uniform Resource Indicator (URI).

In some embodiments, the first network node trains and/or updates the AI/ML model.

In yet some embodiments, the first network node sends a fifth message to a third network node to update the AI/ML model.

A fifth message can be implemented as part of an existing 3GPP message such as an XnAP NG-RAN NODE CONFIGURATION UPDATE or as a new 3GPP standard message, such as "UPDATE AI/ML MODEL".

Figure 7:
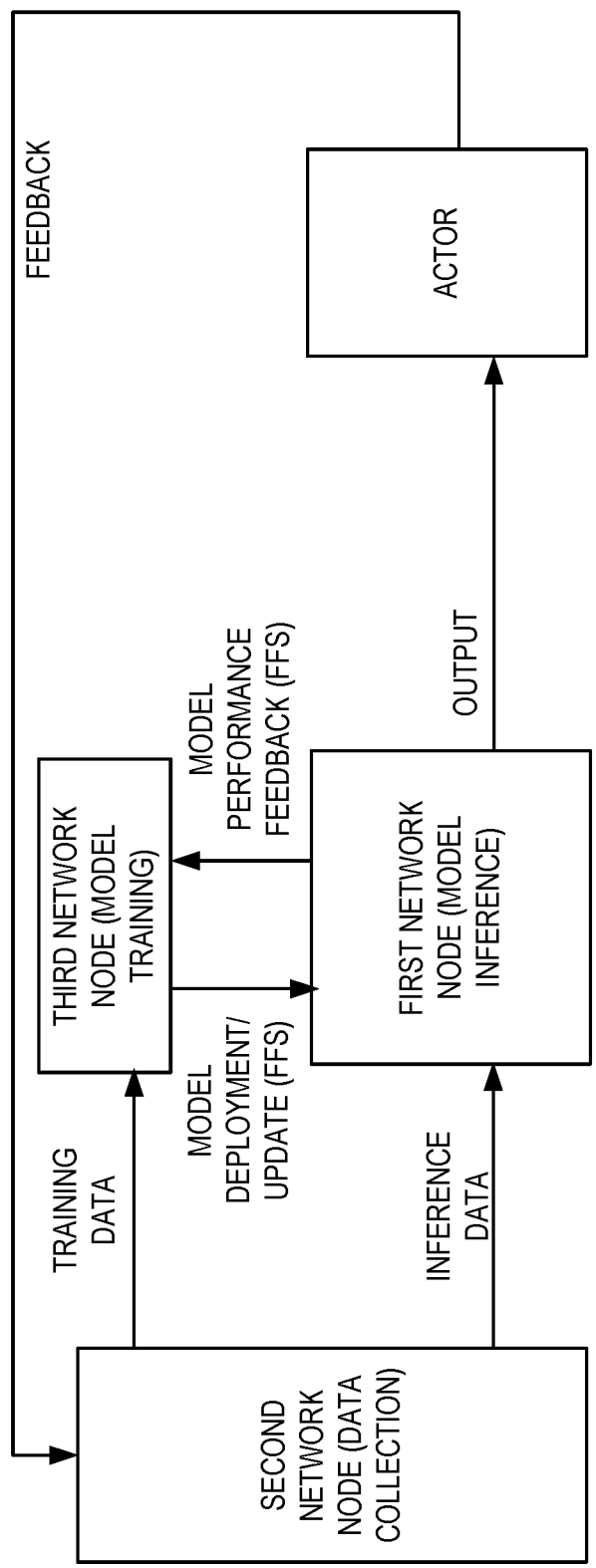
FIG. 7 illustrates an exemplary embodiment in which a first network node hosts a model inference function, a second network node hosts a data collection function, and a third node hosts a model training function, according to some embodiments disclosed herein.

In a second scenario, a first network node hosts a model inference function, a second network node hosts a data collection function, and a third node hosts a model training function. FIG. 7 illustrates this scenario using the AI/ML functional framework discussed in 3GPP. In the second scenario, operations may further comprise the embodiments listed below.

In some embodiments, the first network node sends a fifth message to a third network node hosting a model training function, comprising at least a performance metric associated with the AI/ML model monitored by the first network node.

In some embodiments, the first network node may:
determine or obtain an indication, based at least in part on at least one performance metric associated with the AI/ML model or algorithm to be monitored, whether the AI/ML model fulfils at least a retraining criterion
sends a fifth message to a third network node hosting a model training function, comprising a request to retrain the monitored AI/ML model In some embodiments, a retraining criterion for an AI/ML model can be one or more of the following:
retrain the AI/ML model if at least one model performance metric is less than or exceeds a first threshold
retrain the AI/ML model if at least one model performance metric is less than a first threshold and exceeds a second threshold
retrain the AI/ML model if at least one model performance metric is less than a first threshold for at least a pre-defined period of time.
retrain the AI/ML model if at least one model performance metric is less than or exceeds a first threshold
retrain the AI/ML model if at least one model performance metric is less than a first threshold and exceeds a second threshold
retrain the AI/ML model if the average of at least one model performance metric over a pre-defined period of time is less than a first threshold retrain the AI/ML model if a second statistical momentum of at least one model performance metric over a predefined period of time, such as the variance or standard deviation, is less than a first threshold In some embodiments, wherein the first network node is the host of a model inference function responsible for executing the AI/ML model or algorithm to be monitored, the method may further comprise the step of receiving a sixth message from the third network node, the sixth message comprising an updated AI/ML model (based on the previous request or on the indicated model performance feedback)

In some embodiments a second network node in a radio communication network hosting a data collection function of an AI/ML model or algorithm:

receives from a first network node a first message comprising a request (subscription request) to receive historical data, as detailed in the embodiment for the first network node sends to the first network node at least a second message comprising historical data associated with the AI/ML model or algorithm to be monitored by the first network node In some embodiments, the second network node may additionally:

receive a third message from the first network node or from the third network node comprising a request to subscribe to one or more training data samples associated with the AI/ML model monitored by the first network node send at least a fourth message to the first network node or to the third network node comprising one or more training data samples associated with the AI/ML model monitored by the first network node In some embodiments wherein historical data can be obtained by the first network node from a fourth network node, the second network node may additionally:

send to the first network node a second message comprising indications indicating one or more fourth network node that can be requested to send historical data In some embodiments wherein the second network node sends to the first network node one or more notifications, the second network node may additionally:

send to the first network node a second message comprising notification notifying the first network node responsive to one or more notification requests comprised in the first message In some embodiments a third network node receives a fifth message from the first network node, wherein:

for the case (e.g., the first scenario discussed above) where the third network node is the host of a model inference function, the fifth message comprises an updated AI/ML model, or for the case (e.g., the second scenario discussed above) where the third network node is the host of a model training function, the fifth message comprises at least one performance metric associated with the AI/ML model monitored the by the first network node and/or a request to re-train the AI/ML monitored by the first network node. In addition, the fifth message in this case may further comprise one or more of an indication of the average performance metric over a period of time associated with the AI/ML model or algorithm monitored by the first network node an indication of at least a second statistical momentum of the performance metric over a period of time associated with the AI/ML model or algorithm monitored by the first network node, such as a standard deviation or variance An indication of a performance variation, such as a performance delta, compared to a previously reported value of the performance of the AI/ML model monitored by the first network node.

In some embodiments (e.g., the second scenario discussed above) where the third network node is the host of a model training function, the third network node may additionally further:

send a third message to the second network node comprising a request to subscribe to one or more training data samples associated with the AI/ML model monitored by the first network node.

receive at least a fourth message from the second network node comprising one or more training data samples associated with the AI/ML model monitored by the first network node.

send a sixth message to the first network node, the sixth message comprising an updated AI/ML model (based on the previous request or on the indicated model performance feedback).

In some embodiments, and prior to the sending of a subscription request comprised in a first message, the first network node and the second network node may go through a procedure wherein the first network node and the second network node exchange first network node and second network node capabilities concerning the subscription, the sending and the reception of historical data and/or training data.

In some embodiments, the first message can be realized using a new or an existing signaling message defined for one of interfaces defined by 3GPP or by ORAN, such as Xn, X2, S1, NG, F1, E1, Uu (NR or LTE), W1, O1, O2, A1, E2, Open Fronthaul.

In some embodiments, a first message can be a "DATA TRANSFER SUBSCRIPTION REQUEST" message (or alike) and a second message can be a "DATA TRANSFER SUBSCRIPTION RESPONSE" message, a "DATA TRANSFER NOTIFICATION" message, a "DATA TRANSFER UPDATE" message.

In some embodiments, the first message and the second message can be realized as part of new 3GPP NR or E-UTRA procedures (e.g. over XnAP, X2AP, F1AP, E1AP, NGAP, S1AP, W1AP, NR RRC, E-UTRA RRC), such as "Data Transfer", or "DL Data Transfer" procedure, or "UL Data Transfer" procedure (or alike), comprising a first message implemented respectively as a "DATA TRANSFER REQUEST" message, or as a "DL DATA TRANSFER REQUEST" message or as a "UL DATA TRANSFER REQUEST" message (or alike) and a second message implemented respectively as a "DATA TRANSFER RESPONSE" message, or as a "DL DATA TRANSFER RESPONSE" message, or an "UL DATA TRANSFER RESPONSE" message (or alike).

In some embodiments, one or more second messages can be signaling messages pertaining to different 3GPP procedures, wherein a first second message is a signaling message comprised in a first 3GPP procedure (e.g., an XnAP Resource Status Reporting Initiation procedure or similar) and a subsequent second message is a signaling message comprised in a second 3GPP procedure (e.g. an XnAP Resource Status Reporting procedure or similar).

For example, in case of historical data concerning load metrics exchanged between gNBs, the first message can be realized reusing the existing XnAP RESOURCE STATUS REQUEST message and adding one information element indicating that the request is performed to collect historical data and/or training data, a first second message can be realized by reusing the existing XnAP RESOURCE STATUS RESPONSE message and a subsequent second message can be realized by reusing the existing XnAP RESOURCE STATUS UPDATE message.

In the following, an example is provided for XnAP implementation:

---

Figure 8:
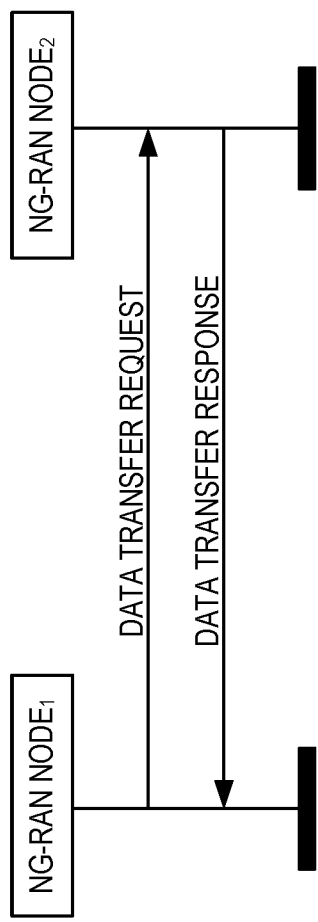
FIG. 8 illustrates communications flows that occur during a data transfer procedure that may be used by a New Generation (NG) RAN (NG-RAN) node to request the reporting of historical data or training data samples to another NG-RAN node, according to some embodiments disclosed herein.
Figure 9:
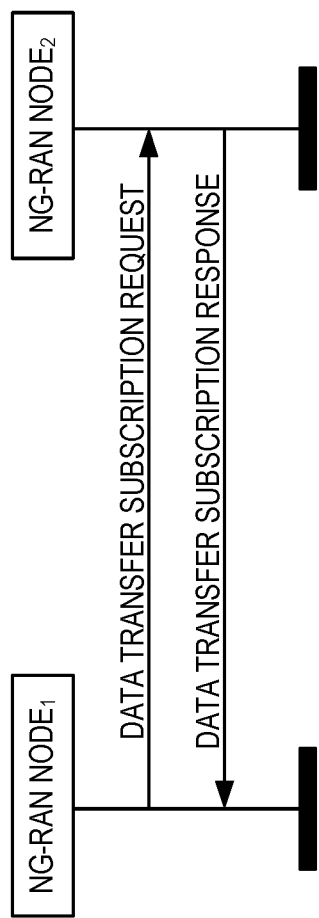
FIG. 9 illustrates communications flows that occur during a data transfer subscription procedure that may be used by an NG-RAN node to subscribe to the reporting of historical data or training data samples to another NG-RAN node, according to some embodiments disclosed herein.
Figure 10:
FIG. 10 illustrates communications flows that occur during a data transfer reporting procedure that may be initiated by an NG-RAN node to report historical data or training data samples admitted by the NG-RAN node following a successful data transfer subscription procedure, according to some embodiments disclosed herein.

8.4.x.x1 Data Transfer
This procedure is used by an NG-RAN node to request the reporting of historical data or training data samples to another NG-RAN node.
The procedure uses non UE-associated signalling.
8.4.x.x1.1 Successful Operation [shown in FIG. 8]
8.4.x.x2 Data Transfer Subscription
This procedure is used by an NG-RAN node to subscribe to the reporting of historical data or training data samples to another NG-RAN node.
The procedure uses non UE-associated signalling.
8.4.x.x2.1 Successful Operation [shown in FIG. 9]
8.4.x.x3 Data Transfer Reporting
This procedure is initiated by an NG-RAN node to report historical data or training data samples admitted by the NG-RAN node following a successful Data Transfer Subscription procedure.
The procedure uses non UE-associated signalling.
8.4.x.x3.1 Successful Operation [shown in FIG. 10]

---

Figure 11:
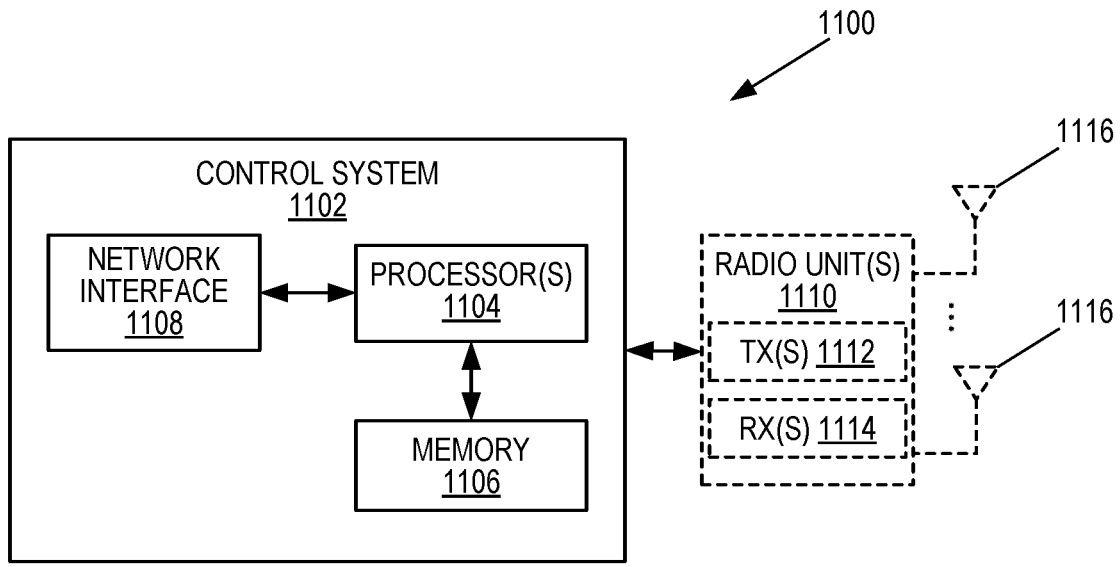
FIG. 11 illustrates a radio access node according to some embodiments disclosed herein.

FIG. 11 is a schematic block diagram of a radio access node 1100 according to some embodiments of the present disclosure. Optional features are represented by dashed boxes. The radio access node 1100 may be, for example, a base station 502 or 506 or a network node that implements all or part of the functionality of the base station 502 or gNB described herein. As illustrated, the radio access node 1100 includes a control system 1102 that includes one or more processors 1104 (e.g., Central Processing Units (CPUs), Application Specific Integrated Circuits (ASICs), Field Programmable Gate Arrays (FPGAs), and/or the like), memory 1106, and a network interface 1108. The one or more processors 1104 are also referred to herein as processing circuitry. In addition, the radio access node 1100 may include one or more radio units 1110 that each includes one or more transmitters 1112 and one or more receivers 1114 coupled to one or more antennas 1116. The radio units 1110 may be referred to or be part of radio interface circuitry. In some embodiments, the radio unit(s) 1110 is external to the control system 1102 and connected to the control system 1102 via, e.g., a wired connection (e.g., an optical cable). However, in some other embodiments, the radio unit(s) 1110 and potentially the antenna(s) 1116 are integrated together with the control system 1102. The one or more processors 1104 operate to provide one or more functions of a radio access node 1100 as described herein. In some embodiments, the function(s) are implemented in software that is stored, e.g., in the memory 1106 and executed by the one or more processors 1104.

Figure 12:
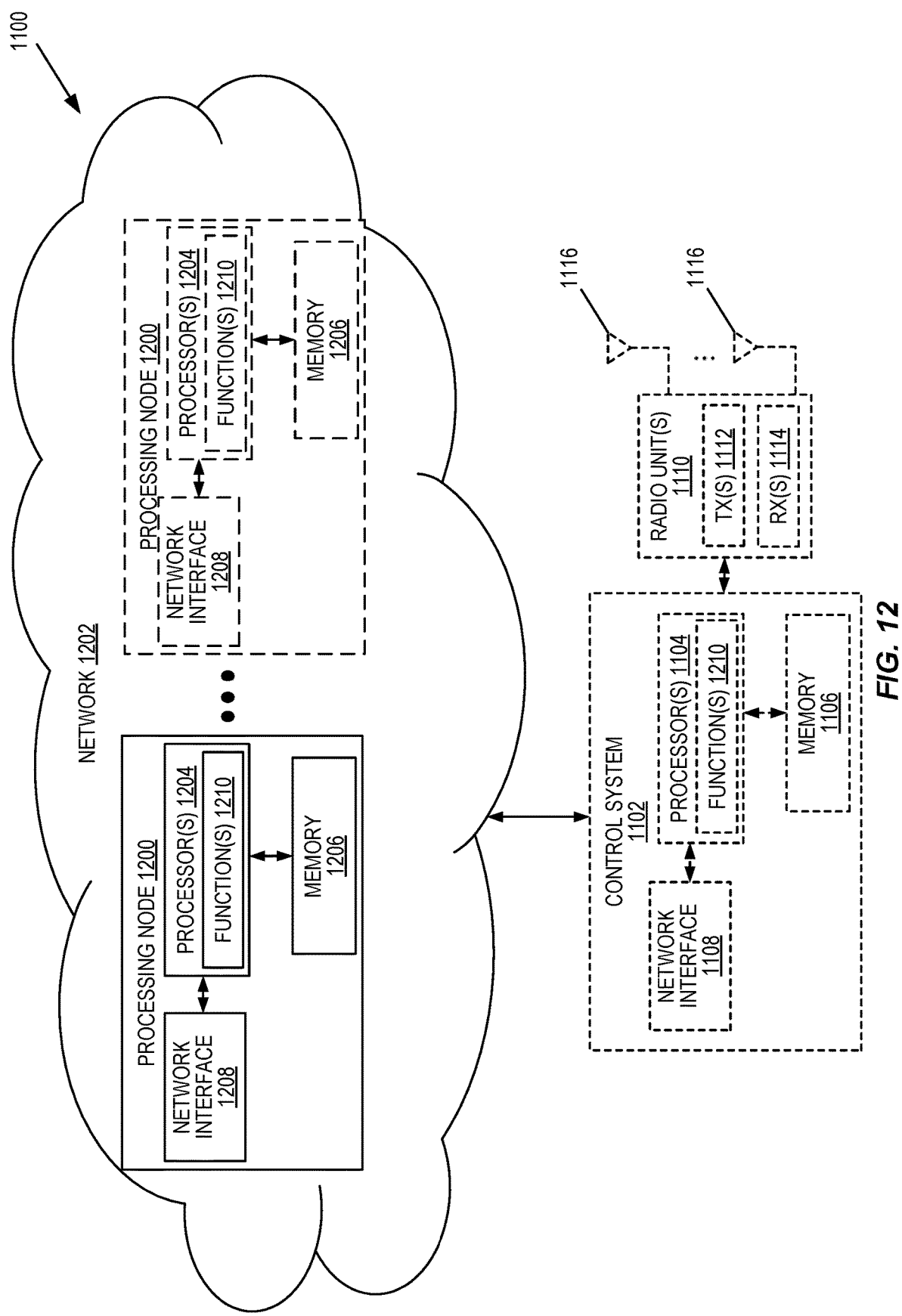
FIG. 12 illustrates a virtualized embodiment of the radio access node of FIG. 11 according to some embodiments disclosed herein.

FIG. 12 is a schematic block diagram that illustrates a virtualized embodiment of the radio access node 1100 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the radio access node 1100 in which at least a portion of the functionality of the radio access node 1100 is implemented as a virtual component(s) (e.g., via a virtual machine(s) executing on a physical processing node(s) in a network(s)). As illustrated, in this example, the radio access node 1100 may include the control system 1102 and/or the one or more radio units 1110, as described above. The control system 1102 may be connected to the radio unit(s) 1110 via, for example, an optical cable or the like. The radio access node 1100 includes one or more processing nodes 1200 coupled to or included as part of a network(s) 1202. If present, the control system 1102 or the radio unit(s) are connected to the processing node(s) 1200 via the network 1202. Each processing node 1200 includes one or more processors 1204 (e.g., CPUs, ASICs, FPGAs, and/or the like), memory 1206, and a network interface 1208.

In this example, functions 1210 of the radio access node 1100 described herein are implemented at the one or more processing nodes 1200 or distributed across the one or more processing nodes 1200 and the control system 1102 and/or the radio unit(s) 1110 in any desired manner. In some particular embodiments, some or all of the functions 1210 of the radio access node 1100 described herein are implemented as virtual components executed by one or more virtual machines implemented in a virtual environment(s) hosted by the processing node(s) 1200. As will be appreciated by one of ordinary skill in the art, additional signaling or communication between the processing node(s) 1200 and the control system 1102 is used in order to carry out at least some of the desired functions 1210. Notably, in some embodiments, the control system 1102 may not be included, in which case the radio unit(s) 1110 communicate directly with the processing node(s) 1200 via an appropriate network interface(s).

In some embodiments, a computer program including instructions which, when executed by at least one processor, causes the at least one processor to carry out the functionality of radio access node 1100 or a node (e.g., a processing node 1200) implementing one or more of the functions 1210 of the radio access node 1100 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 13:
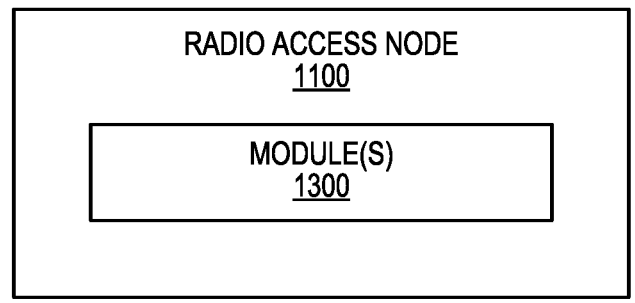
FIG. 13 illustrates the radio access node according to some other embodiments disclosed herein.

FIG. 13 is a schematic block diagram of the radio access node 1100 according to some other embodiments of the present disclosure. The radio access node 1100 includes one or more modules 1300, each of which is implemented in software. The module(s) 1300 provide the functionality of the radio access node 1100 described herein. This discussion is equally applicable to the processing node 1200 of FIG. 12 where the modules 1300 may be implemented at one of the processing nodes 1200 or distributed across multiple processing nodes 1200 and/or distributed across the processing node(s) 1200 and the control system 1102.

Figure 14:
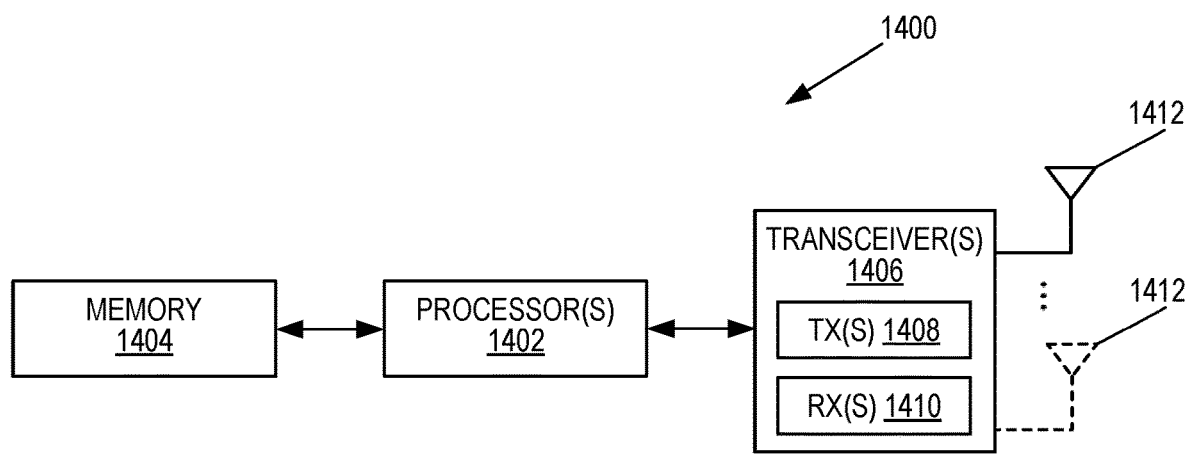
FIG. 14 illustrates a UE according to some embodiments disclosed herein.

FIG. 14 is a schematic block diagram of a wireless communication device 1400 according to some embodiments of the present disclosure. As illustrated, the wireless communication device 1400 includes one or more processors 1402 (e.g., CPUs, ASICs, FPGAs, and/or the like), memory 1404, and one or more transceivers 1406 each including one or more transmitters 1408 and one or more receivers 1410 coupled to one or more antennas 1412. The transceiver(s) 1406 includes radio-front end circuitry connected to the antenna(s) 1412 that is configured to condition signals communicated between the antenna(s) 1412 and the processor(s) 1402, as will be appreciated by on of ordinary skill in the art. The processors 1402 are also referred to herein as processing circuitry. The transceivers 1406 are also referred to herein as radio circuitry. In some embodiments, the functionality of the wireless communication device 1400 described above may be fully or partially implemented in software that is, e.g., stored in the memory 1404 and executed by the processor(s) 1402. Note that the wireless communication device 1400 may include additional components not illustrated in FIG. 14 such as, e.g., one or more user interface components (e.g., an input/output interface including a display, buttons, a touch screen, a microphone, a speaker(s), and/or the like and/or any other components for allowing input of information into the wireless communication device 1400 and/or allowing output of information from the wireless communication device 1400), a power supply (e.g., a battery and associated power circuitry), and the like.

In some embodiments, a computer program including instructions which, when executed by at least one processor, causes the at least one processor to carry out the functionality of the wireless communication device 1400 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 15:
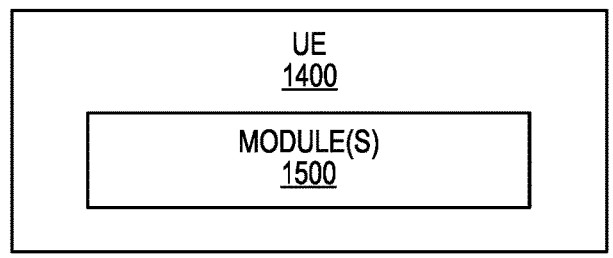
FIG. 15 illustrates the UE of FIG. 14 according to some other embodiments disclosed herein.

FIG. 15 is a schematic block diagram of the wireless communication device 1400 according to some other embodiments of the present disclosure. The wireless communication device 1400 includes one or more modules 1500, each of which is implemented in software. The module(s) 1500 provide the functionality of the wireless communication device 1400 described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, and the like. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, and the like).

Some example embodiments of the present disclosure are as follows:

Embodiment 1: A method performed by a first network node in a radio communication network to monitor the performance of an Artificial Intelligence (AI)/Machine Learning (ML) model or algorithm, the method comprising:

sending at least one first message to a second network node of the radio communication network, the at least one first message comprising a subscription request to obtain from the second network node one or more historical data elements associated with the AI/ML model or algorithm;

receiving at least one second message from the second network node, the at least one second message comprising one or more historical data elements associated with the AI/ML model or algorithm to be monitored by the first network node; and determining at least one performance metric associated with the AI/ML model or algorithm to be monitored based on the one or more historical data elements associated with the AI/ML model.

Embodiment 2: The method of embodiment 1, wherein the subscription request comprises one or more of:
an identifier of the first network node;
an identifier for the subscription request;
an indication of a request type;
an indication of a reason or cause for the request;
one or more indications of a corresponding one or more AI/ML models or algorithms to be monitored;
an indication of a network node hosting a model inference function associated with the AI/ML model or algorithm to be monitored;
one or more indications of a time or period of the collection of data;
an indication of the type of data requested;
a timing-related indications;
one or more filtering criteria indicating a type or scope of requested historical data;
one or more requests to receive from the second network node notifications associated with the historical data;
and one or more conditions pertaining to the sending of historical data.

Embodiment 3: The method of embodiment 2, wherein the indication of the request type comprises an indication to initiate a subscription, an indication to renew a subscription, or an indication to cancel a subscription.

Embodiment 4: The method of embodiment 2, wherein the indication of the type of data requested comprises one or more of:
historical inference input data associated with the AI/ML model to be monitored;
historical inference output associated with the AI/ML model to be monitored, comprising one or more information elements that resulted from each inference step executed by the AI/ML model or algorithm to be monitored; and
historical measurements of information that the AI/ML model or algorithm to be monitored is configured to estimate or predict.

Embodiment 5: The method of embodiment 2, wherein the one or more filtering criteria indicating the type or scope of requested historical data comprises one or more of periods of collection, data selected in a random fashion, data associated with one or more radio network procedure, data related to one or more user equipment (UE) or type of UE, data pertaining to performance indicators, data pertaining to UE or network configuration data, data collected for one or more area of interests, data collected for one or more S-NSSAI, data collected for or one or more 5QI, data collected for one or more services, data collected for MDT, data collected for QoE, radio measurements, load metrics, and data related to energy savings.

Embodiment 6: The method of embodiment 2, wherein the one or more conditions pertaining to the sending of historical data comprises one or more of:
  a periodic sending with a reporting periodicity;
  a sending based on event;
  timing indications;
  indications of a size of historical data required to monitor the AI/ML model or algorithm; and
  indications to start, stop, pause, or resume sending of historical data.

Embodiment 7: The method of embodiment 2, wherein the one or more requests to receive from the second network node notifications associated with the historical data comprises a request to receive a notification when requested data is available or not available, when historical data of a certain type becomes available, when a modification is occurring or has occurred in the historical data, which type of modification or a quantification of the change, or when sending historical data is expected to start, stop, pause, or resume.

Embodiment 8: The method of embodiment 1, wherein the at least one second message comprises one or more of an identifier of the second network node, an identifier of the subscription request, an identifier of the request type, historical data stored or collected by the second network node associated with the AI/ML model or algorithm to be monitored, and a timing related indications.

Embodiment 9: The method of embodiment 1, wherein:
  the at least one second message further comprises an indication of one or more fourth network nodes that can be requested to send historical data; and
  wherein the indication comprises one or more of an Internet Protocol, IP, address, a Uniform Resource Locator (URL), and a Uniform Resource Indicator (URI).

Embodiment 10: The method of embodiment 1, wherein the at least one second message further comprises at least one notification providing the first network node with a response to one or more notification requests of the first message.

Embodiment 11: The method of embodiment 1, wherein the performance metric comprises one or more of an indication of accuracy of a model inference function, an indication of whether or not an output of an AI/ML model inference is affected by a certain type of uncertainty, an indication of a type of uncertainty affecting the output of the AI/ML model inference, an indication of a level of uncertainty affecting the output of the AI/ML model inference, and an indication of a bias in an input or in the output of the AI/ML model inference.

Embodiment 12: The method of embodiment 1, wherein:
  the first network node hosts a model training function of the AI/ML model or algorithm to be monitored;
  the second network node hosts a data collection function of an AI/ML model or algorithm; and
  a third network node hosts a model inference function of the AI/ML model or algorithm.

Embodiment 13: The method of embodiment 12, further comprising sending a third message to the second network node, the third message comprising a request to subscribe to one or more training data samples associated with the AI/ML model monitored by the first network node.

Embodiment 14: The method of embodiment 13, further comprising receiving a fourth message from the second network node, the fourth message comprising one or more training data samples associated with the AI/ML model or algorithm to be monitored.

Embodiment 15: The method of embodiment 14, wherein:
  the fourth message comprises an indication of one or more fourth network nodes that can be contacted to obtain training data samples associated with the AI/ML model or algorithm; and
  wherein the indication comprises one or more of an Internet Protocol, IP, address, a Uniform Resource Locator (URL), and a Uniform Resource Indicator (URI).

Embodiment 16: The method of embodiment 13, further comprising training the AI/ML model.

Embodiment 17: The method of embodiment 13, further comprising sending a fifth message to a third network node to update the AI/ML model.

Embodiment 18: The method of embodiment 1, wherein:
  the first network node hosts a model inference function of the AI/ML model or algorithm to be monitored;
  the second network node hosts a data collection function of the AI/ML model or algorithm; and
  a third network node hosts a model training function of the AI/ML model or algorithm.

Embodiment 19: The method of embodiment 18, wherein the method further comprises sending a fifth message to the third network node, the fifth message comprising a performance metric associated with the AI/ML model monitored by the first network node.

Embodiment 20: The method of embodiment 18, wherein the method further comprises:
  determining an indication of whether the AI/ML model fulfills a retraining criterion, based on at least one performance metric associated with the AI/ML model or algorithm to be monitored; and
  sending a fifth message to the third network node, the fifth message comprising a request to retrain the AI/ML model or algorithm.

Embodiment 21: The method of embodiment 20, wherein the retraining criterion comprises one or more of:
  a criterion indicating that the AI/ML model should be retrained if at least one model performance metric is less than or exceeds a first threshold;
  a criterion indicating that the AI/ML model should be retrained if at least one model performance metric is less than a first threshold and exceeds a second threshold;
  a criterion indicating that the AI/ML model should be retrained if at least one model performance metric is less than a first threshold for at least a pre-defined period of time;
  a criterion indicating that the AI/ML model should be retrained if at least one model performance metric is less than or exceeds a first threshold;
  a criterion indicating that the AI/ML model should be retrained if at least one model performance metric is less than a first threshold and exceeds a second threshold;
  a criterion indicating that the AI/ML model should be retrained if the average of at least one model performance metric over a pre-defined period of time is less than a first threshold; and
  a criterion indicating that the AI/ML model should be retrained a second statistical momentum of at least one model performance metric over a pre-defined period of time is less than a first threshold.

Embodiment 22: The method of embodiment 18, further comprising receiving a sixth message from the third network node, the sixth message comprising an updated AI/ML model.

Embodiment 23: A first network node for monitoring the performance of an Artificial Intelligence (AI)/Machine Learning (ML) model or algorithm, the network node comprising:
  one or more transmitters;
  one or more receivers; and
  processing circuitry associated with the one or more transmitters and the one or more receivers, the processing circuitry configured to cause the first network node to:
    send at least one first message to a second network node of the radio communication network, the at least one first message comprising a subscription request to obtain from the second network node one or more historical data elements associated with the AI/ML model or algorithm;
    receive at least one second message from the second network node, the at least one second message comprising one or more historical data elements associated with the AI/ML model or algorithm to be monitored by the first network node; and
    determine at least one performance metric associated with the AI/ML model or algorithm to be monitored based on the one or more historical data elements associated with the AI/ML model.

Embodiment 24: The first network node of embodiment 23, wherein the processing circuitry is further configured to cause the first network node to perform the method of any one of embodiments 2-22.

Embodiment 25: A first network node for monitoring the performance of an Artificial Intelligence (AI)/Machine Learning (ML) model or algorithm, the network node adapted to:
  send at least one first message to a second network node of the radio communication network, the at least one first message comprising a subscription request to obtain from the second network node one or more historical data elements associated with the AI/ML model or algorithm;
  receive at least one second message from the second network node, the at least one second message comprising one or more historical data elements associated with the AI/ML model or algorithm to be monitored by the first network node; and
  determine at least one performance metric associated with the AI/ML model or algorithm to be monitored based on the one or more historical data elements associated with the AI/ML model.

Embodiment 26: The first network node of embodiment 25, wherein the first network node is further adapted to perform the method of any one of embodiments 2-22.

Embodiment 27: A method performed by a second network node in a radio communication network for hosting a data collection function of an Artificial Intelligence (AI)/Machine Learning (ML) model or algorithm, the method comprising:
  receiving at least one first message from a first network node of the radio communication network, the at least one first message comprising a subscription request to obtain from the second network node one or more historical data elements associated with the AI/ML model or algorithm; and
  sending at least one second message to the first network node, the at least one second message comprising one or more historical data elements associated with the AI/ML model or algorithm to be monitored by the first network node.

Embodiment 28: The method of embodiment 27, further comprising:
  receiving a third message from the first network node, the third message comprising a request to subscribe to one or more training data samples associated with the AI/ML model monitored by the first network node; and
  sending a fourth message to the first network node, the fourth message comprising one or more training data samples associated with the AI/ML model or algorithm to be monitored.

Embodiment 29: The method of embodiment 27, further comprising sending a fifth message to the first network node, the fifth message comprising an indication of one or more fourth network nodes that can be requested to send historical data.

Embodiment 30: The method of embodiment 27, further comprising sending a sixth message to the first network node, the sixth message comprising a notification notifying the first network node in response to a notification request of the first message.

Embodiment 31: A second network node for hosting a data collection function of an Artificial Intelligence (AI)/Machine Learning (ML) model or algorithm, the second network node comprising:
  one or more transmitters;
  one or more receivers; and
  processing circuitry associated with the one or more transmitters and the one or more receivers, the processing circuitry configured to cause the second network node to:
    receive at least one first message from a first network node of the radio communication network, the at least one first message comprising a subscription request to obtain from the second network node one or more historical data elements associated with the AI/ML model or algorithm; and
    send at least one second message to the first network node, the at least one second message comprising one or more historical data elements associated with the AI/ML model or algorithm to be monitored by the first network node.

Embodiment 32: The second network node of embodiment 31, wherein the processing circuitry is further configured to cause the network node to perform the method of any one of embodiments 28-30.

Embodiment 33: A second network node for hosting a data collection function of an Artificial Intelligence (AI)/Machine Learning (ML) model or algorithm, the second network node adapted to:
  receive at least one first message from a first network node of the radio communication network, the at least one first message comprising a subscription request to obtain from the second network node one or more historical data elements associated with the AI/ML model or algorithm; and
  send at least one second message to the first network node, the at least one second message comprising one or more historical data elements associated with the AI/ML model or algorithm to be monitored by the first network node.

Embodiment 34: The second network node of embodiment 33, wherein the second network node is further adapted to perform the method of any one of embodiments 28-30.

Embodiment 35: A method performed by a third network node in a radio communication network for hosting a model training function of an Artificial Intelligence (AI)/Machine Learning (ML) model or algorithm, the method comprising:

receiving a fifth message from a first network node, the fifth message comprising one or more of at least one performance metric associated with an AI/ML model or algorithm monitored by the first network node and a request to retrain the AI/ML model or algorithm monitored by the first network node;

sending a third message to a second network node comprising a request to subscribe to one or more training data samples associated with the AI/ML model or algorithm monitored by the first network node;

receiving at least one fourth message from the second network node, the at least one fourth message comprising one or more training data samples associated with the AI/ML model or algorithm monitored by the first network node; and sending a sixth message to the first network node, the sixth message comprising an updated AI/ML model.

Embodiment 36: A third network node for hosting a model training function of an Artificial Intelligence (AI)/Machine Learning (ML) model or algorithm, the third network node comprising:

one or more transmitters;
one or more receivers; and
processing circuitry associated with the one or more transmitters and the one or more receivers, the processing circuitry configured to cause the third network node to:
  receive a fifth message from a first network node, the fifth message comprising one or more of at least one performance metric associated with an AI/ML model or algorithm monitored by the first network node and a request to retrain the AI/ML model or algorithm monitored by the first network node;
  send a third message to a second network node comprising a request to subscribe to one or more training data samples associated with the AI/ML model or algorithm monitored by the first network node;
  receive at least one fourth message from the second network node, the at least one fourth message comprising one or more training data samples associated with the AI/ML model or algorithm monitored by the first network node; and
  send a sixth message to the first network node, the sixth message comprising an updated AI/ML model.

Embodiment 37: A third network node for hosting a model training function of an Artificial Intelligence (AI)/Machine Learning (ML) model or algorithm, the third network node adapted to:

receive a fifth message from a first network node, the fifth message comprising one or more of at least one performance metric associated with an AI/ML model or algorithm monitored by the first network node and a request to retrain the AI/ML model or algorithm monitored by the first network node;

send a third message to a second network node comprising a request to subscribe to one or more training data samples associated with the AI/ML model or algorithm monitored by the first network node;

receive at least one fourth message from the second network node, the at least one fourth message comprising one or more training data samples associated with the AI/ML model or algorithm monitored by the first network node; and send a sixth message to the first network node, the sixth message comprising an updated AI/ML model.

At least some of the following abbreviations may be used in this disclosure. If there is an inconsistency between abbreviations, preference should be given to how it is used above. If listed multiple times below, the first listing should be preferred over any subsequent listing(s).

| | |
|---|---|
| 3GPP | Third Generation Partnership Project |
| 5G | Fifth Generation |
| 5GC | Fifth Generation Core |
| 5GS | Fifth Generation System |
| AF | Application Function |
| AMF | Access and Mobility Function |
| AN | Access Network |
| AP | Access Point |
| ASIC | Application Specific Integrated Circuit |
| AUSF | Authentication Server Function |
| CPU | Central Processing Unit |
| DN | Data Network |
| DSP | Digital Signal Processor |
| eNB | Enhanced or Evolved Node B |
| EPS | Evolved Packet System |
| E-UTRA | Evolved Universal Terrestrial Radio Access |
| FPGA | Field Programmable Gate Array |
| gNB | New Radio Base Station |
| gNB-DU | New Radio Base Station Distributed Unit |
| HSS | Home Subscriber Server |
| IoT | Internet of Things |
| IP | Internet Protocol |
| LTE | Long Term Evolution |
| MME | Mobility Management Entity |
| MTC | Machine Type Communication |
| NEF | Network Exposure Function |
| NF | Network Function |
| NR | New Radio |
| NRF | Network Function Repository Function |
| NSSF | Network Slice Selection Function |
| OTT | Over-the-Top |
| PC | Personal Computer |
| PCF | Policy Control Function |
| P-GW | Packet Data Network Gateway |
| QoS | Quality of Service |
| RAM | Random Access Memory |
| RAN | Radio Access Network |
| ROM | Read Only Memory |
| RRH | Remote Radio Head |
| RTT | Round Trip Time |
| SCEF | Service Capability Exposure Function |
| SMF | Session Management Function |
| UDM | Unified Data Management |
| UE | User Equipment |
| UPF | User Plane Function |

Those skilled in the art will recognize improvements and modifications to the embodiments of the present disclosure. All such improvements and modifications are considered within the scope of the concepts disclosed herein.

The invention claimed is:

1. A method performed by a first network node in a radio communication network to monitor the performance of an Artificial Intelligence, AI,/Machine Learning, ML, model or algorithm, the method comprising:

sending at least one first message to a second network node of the radio communication network, the at least one first message comprising a subscription request to obtain from the second network node one or more historical data elements associated with the AI/ML model or algorithm;

receiving at least one second message from the second network node, the at least one second message comprising one or more historical data elements associated with the AI/ML model or algorithm to be monitored by the first network node; and determining at least one performance metric associated with the AI/ML model or algorithm to be monitored based on the one or more historical data elements associated with the AI/ML model;

wherein:
the first network node hosts a model training function of the AI/ML model or algorithm to be monitored;
the second network node hosts a data collection function of an AI/ML model or algorithm; and
a third network node hosts a model inference function of the AI/ML model or algorithm.

2. The method of claim 1, wherein the subscription request comprises one or more of:
an identifier of the first network node;
an identifier for the subscription request;
an indication of a request type;
an indication of a reason or cause for the request;
one or more indications of a corresponding one or more AI/ML models or algorithms to be monitored;
an indication of a network node hosting a model inference function associated with the AI/ML model or algorithm to be monitored;
one or more indications of a time or period of the collection of data;
an indication of the type of data requested;
a timing-related indications;
one or more filtering criteria indicating a type or scope of requested historical data;
one or more requests to receive from the second network node notifications associated with the historical data;
and one or more conditions pertaining to the sending of historical data.

3. The method of claim 2, wherein the indication of the request type comprises an indication to initiate a subscription, an indication to renew a subscription, or an indication to cancel a subscription.

4. The method of claim 2, wherein the indication of the type of data requested comprises one or more of:
historical inference input data associated with the AI/ML model to be monitored;
historical inference output associated with the AI/ML model to be monitored, comprising one or more information elements that resulted from each inference step executed by the AI/ML model or algorithm to be monitored; and
historical measurements of information that the AI/ML model or algorithm to be monitored is configured to estimate or predict.

5. The method of claim 2, wherein the one or more filtering criteria indicating the type or scope of requested historical data comprises one or more of periods of collection, data selected in a random fashion, data associated with one or more radio network procedure, data related to one or more user equipment, UE, or type of UE, data pertaining to performance indicators, data pertaining to UE or network configuration data, data collected for one or more area of interests, data collected for one or more S-NSSAI, data collected for or one or more 5QI, data collected for one or more services, data collected for MDT, data collected for QoE, radio measurements, load metrics, and data related to energy savings.

6. The method of claim 2, wherein the one or more conditions pertaining to the sending of historical data comprises one or more of:
a periodic sending with a reporting periodicity;
a sending based on event;
timing indications;
indications of a size of historical data required to monitor the AI/ML model or algorithm; and
indications to start, stop, pause, or resume sending of historical data.

7. The method of claim 2, wherein the one or more requests to receive from the second network node notifications associated with the historical data comprises a request to receive a notification when requested data is available or not available, when historical data of a certain type becomes available, when a modification is occurring or has occurred in the historical data, which type of modification or a quantification of the change, or when sending historical data is expected to start, stop, pause, or resume.

8. The method of claim 1, wherein the at least one second message comprises one or more of an identifier of the second network node, an identifier of the subscription request, an identifier of the request type, historical data stored or collected by the second network node associated with the AI/ML model or algorithm to be monitored, and a timing related indications.

9. The method of claim 1, wherein:
the at least one second message further comprises an indication of one or more fourth network nodes that can be requested to send historical data; and
wherein the indication comprises one or more of an Internet Protocol, IP, address, a Uniform Resource Locator, URL, and a Uniform Resource Indicator, URI.

10. The method of claim 1, wherein the at least one second message further comprises at least one notification providing the first network node with a response to one or more notification requests of the first message.

11. The method of claim 1, wherein the performance metric comprises one or more of an indication of accuracy of a model inference function, an indication of whether or not an output of an AI/ML model inference is affected by a certain type of uncertainty, an indication of a type of uncertainty affecting the output of the AI/ML model inference, an indication of a level of uncertainty affecting the output of the AI/ML model inference, and an indication of a bias in an input or in the output of the AI/ML model inference.

12. The method of claim 1, further comprising sending a third message to the second network node, the third message comprising a request to subscribe to one or more training data samples associated with the AI/ML model monitored by the first network node.

13. The method of claim 12, further comprising receiving a fourth message from the second network node, the fourth message comprising one or more training data samples associated with the AI/ML model or algorithm to be monitored.

14. A first network node for monitoring the performance of an Artificial Intelligence, AI,/Machine Learning, ML, model or algorithm, the network node comprising:
one or more transmitters;
one or more receivers; and
processing circuitry associated with the one or more transmitters and the one or more receivers, the processing circuitry configured to cause the first network node to:
send at least one first message to a second network node of the radio communication network, the at least one first message comprising a subscription request to obtain from the second network node one or more historical data elements associated with the AI/ML model or algorithm;
receive at least one second message from the second network node, the at least one second message comprising one or more historical data elements associated with the AI/ML model or algorithm to be monitored by the first network node; and determine at least one performance metric associated with the AI/ML model or algorithm to be monitored based on the one or more historical data elements associated with the AI/ML model;
wherein:
the first network node hosts a model training function of the AI/ML model or algorithm to be monitored;
the second network node hosts a data collection function of an AI/ML model or algorithm; and
a third network node hosts a model inference function of the AI/ML model or algorithm.

15. A method performed by a second network node in a radio communication network for hosting a data collection function of an Artificial Intelligence, AI,/Machine Learning, ML, model or algorithm, the method comprising:
receiving at least one first message from a first network node of the radio communication network, the at least one first message comprising a subscription request to obtain from the second network node one or more historical data elements associated with the AI/ML model or algorithm;
sending at least one second message to the first network node, the at least one second message comprising one or more historical data elements associated with the AI/ML model or algorithm to be monitored by the first network node;
receiving a third message from the first network node, the third message comprising a request to subscribe to one or more training data samples associated with the AI/ML model monitored by the first network node; and
sending a fourth message to the first network node, the fourth message comprising one or more training data samples associated with the AI/ML model or algorithm to be monitored.

16. The method of claim 15, wherein the second message further comprises an indications of one or more fourth network nodes that can be requested to send historical data.

17. The method of claim 15, wherein the second message further comprises at least one notification providing the first network node with a response to one or more notification requests of the first message.

18. A second network node for hosting a data collection function of an Artificial Intelligence, AI,/Machine Learning, ML, model or algorithm, the second network node comprising:
one or more transmitters;
one or more receivers; and
processing circuitry associated with the one or more transmitters and the one or more receivers, the processing circuitry configured to cause the second network node to:
receive at least one first message from a first network node of the radio communication network, the at least one first message comprising a subscription request to obtain from the second network node one or more historical data elements associated with the AI/ML model or algorithm;
send at least one second message to the first network node, the at least one second message comprising one or more historical data elements associated with the AI/ML model or algorithm to be monitored by the first network node;
receive a third message from the first network node, the third message comprising a request to subscribe to one or more training data samples associated with the AI/ML model monitored by the first network node; and
send a fourth message to the first network node, the fourth message comprising one or more training data samples associated with the AI/ML model or algorithm to be monitored.

* * * * *